April 22, 1958     H. A. JENSEN ET AL     2,831,302
PACKAGING MACHINE
Filed Oct. 6, 1954     18 Sheets-Sheet 1

INVENTORS.
Hans A. Jensen,
Augustus H. Eberman,
By Cromwell, Grist & Warden
Attys INVENTORS
Hans A. Jensen,
Augustus H. Eberman,
By Cromwell, Greist + Warden
Attys

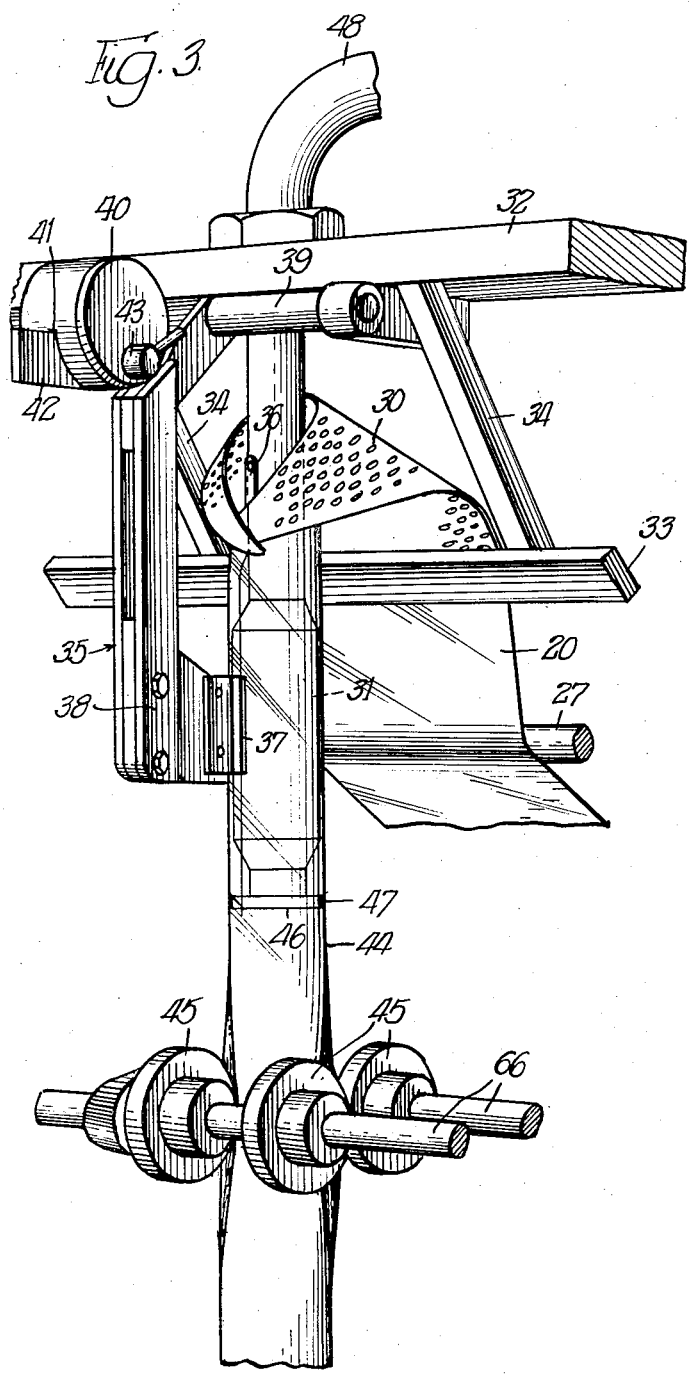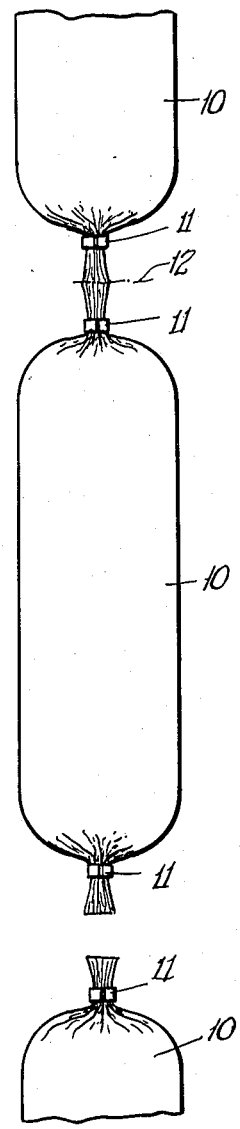

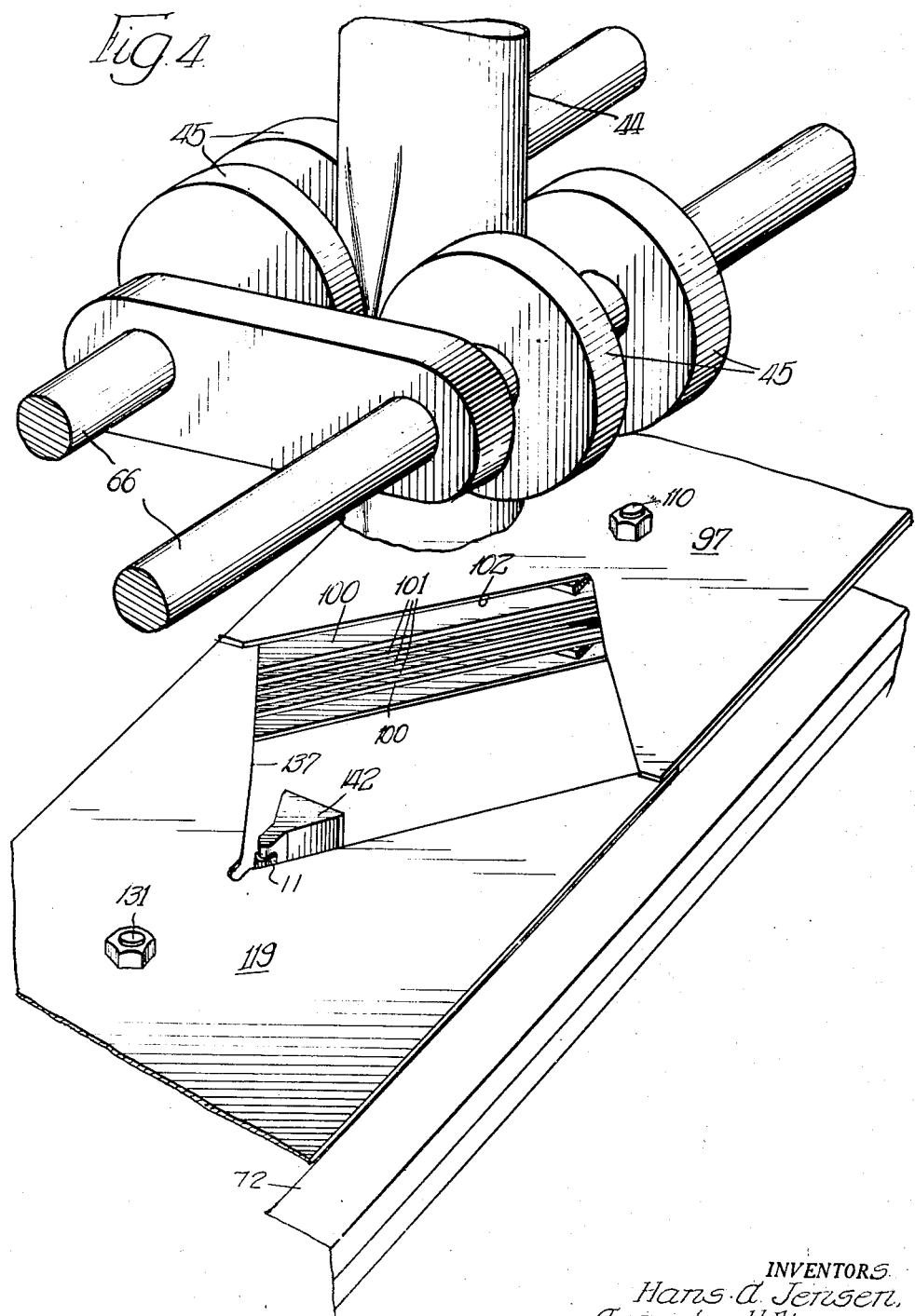

April 22, 1958  H. A. JENSEN ET AL  2,831,302
PACKAGING MACHINE
Filed Oct. 6, 1954
18 Sheets-Sheet 5
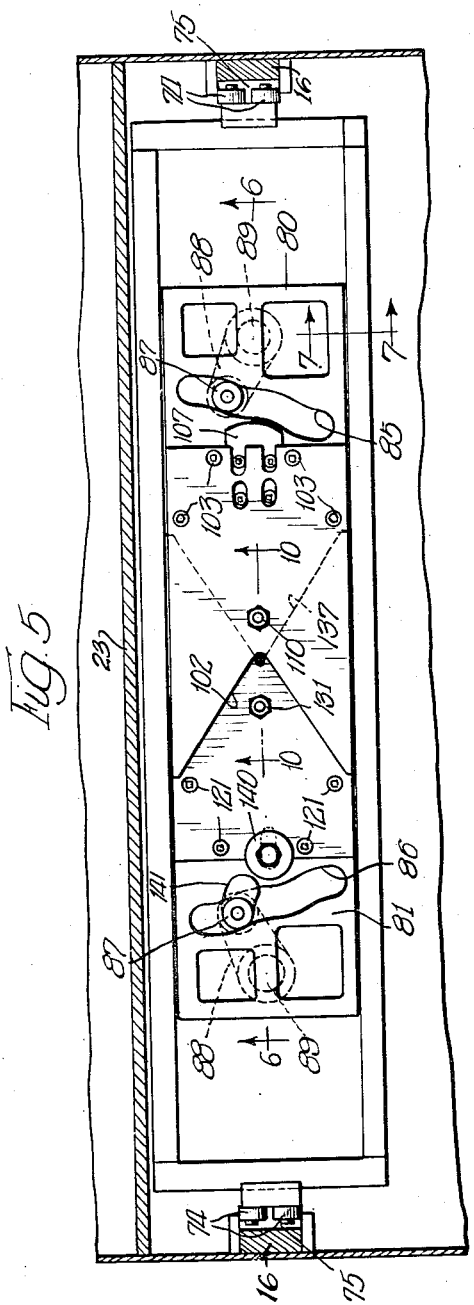
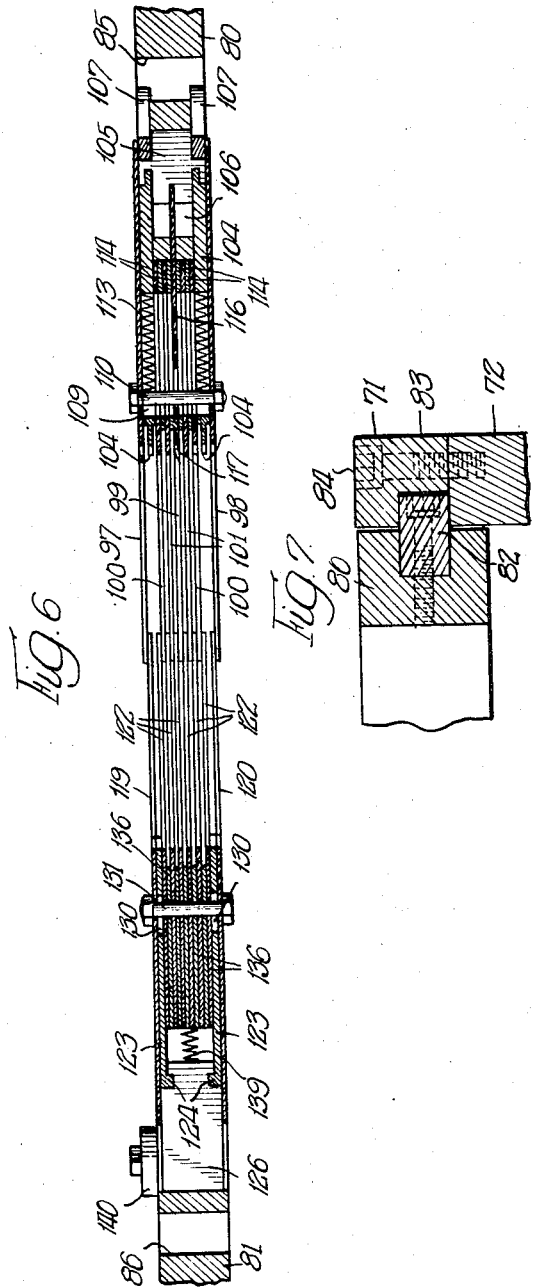
INVENTORS.
Hans A. Jensen,
Augustus H. Eberman,
By Cromwell, Greist & Warden
Attys.

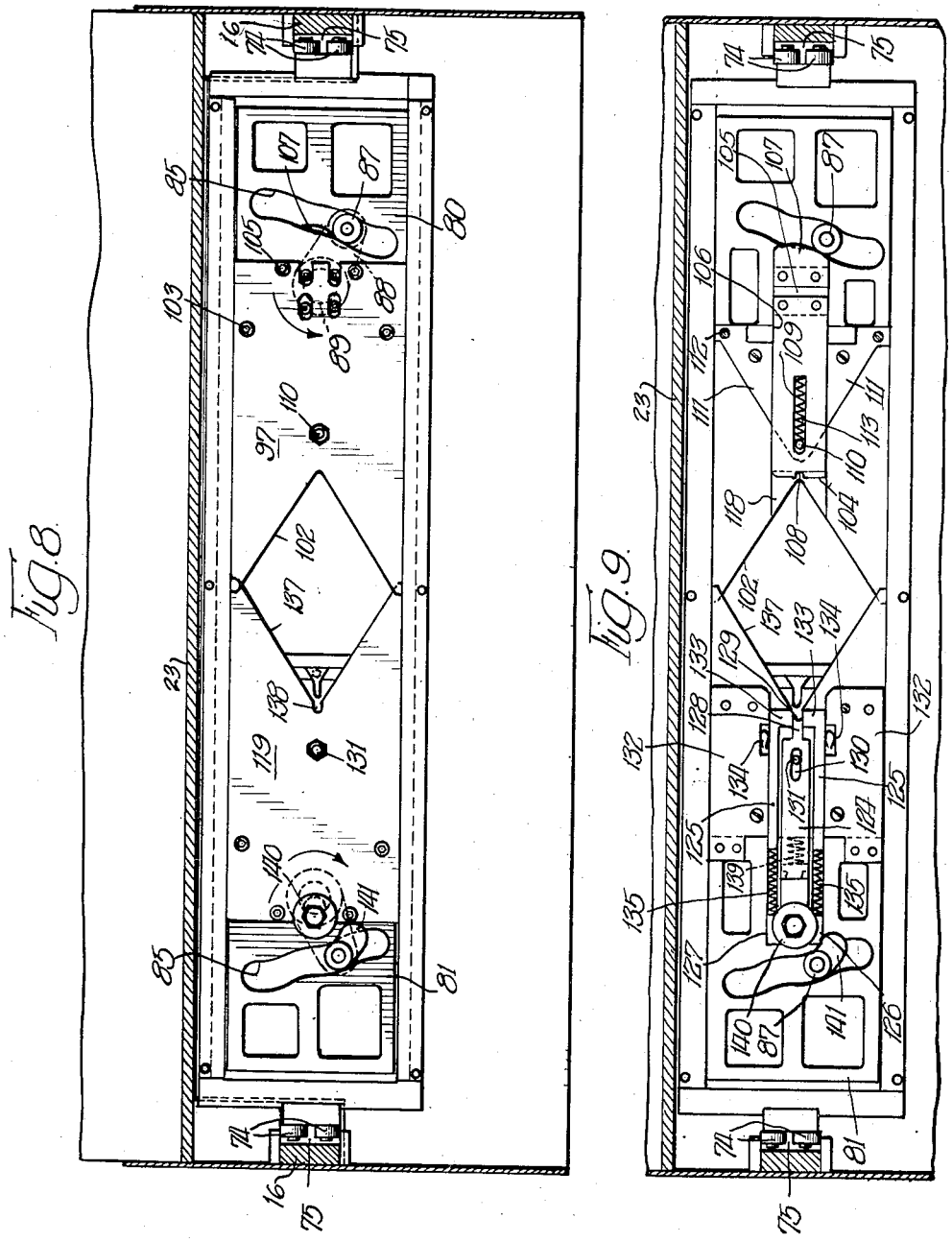

April 22, 1958 H. A. JENSEN ET AL 2,831,302
PACKAGING MACHINE
Filed Oct. 6, 1954 18 Sheets-Sheet 7
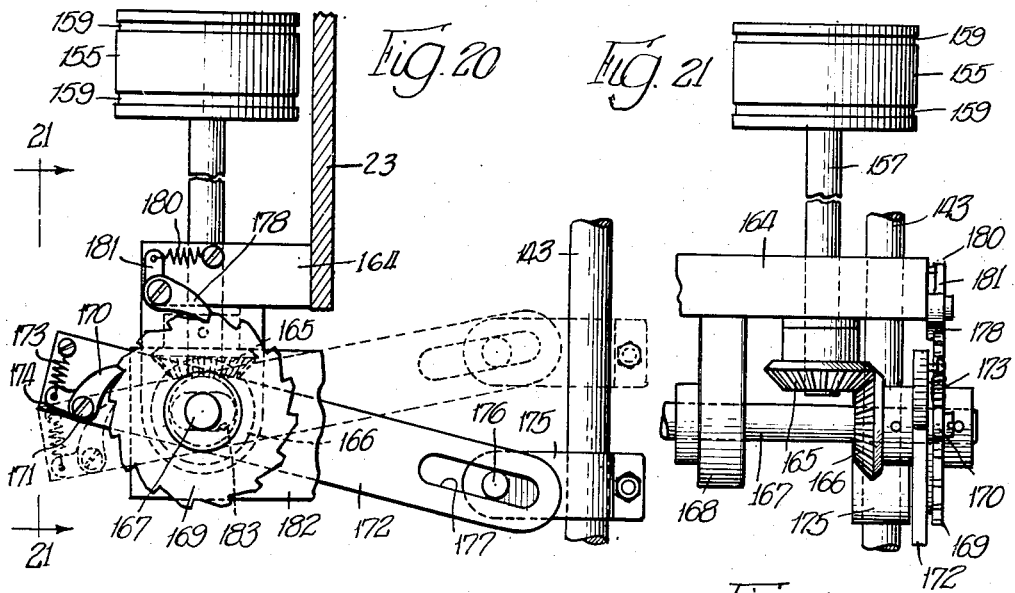
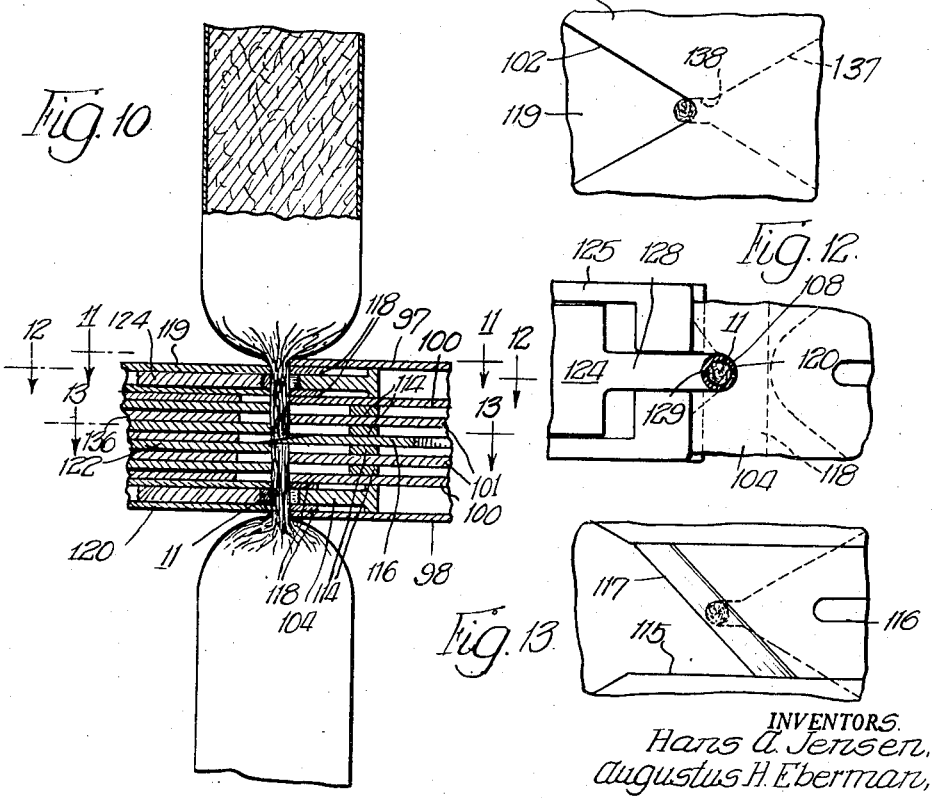
INVENTORS.
Hans A. Jensen,
Augustus H. Eberman,
By Cromwell, Greist & Warden
Attys April 22, 1958  H. A. JENSEN ET AL  2,831,302
PACKAGING MACHINE
Filed Oct. 6, 1954  18 Sheets-Sheet 8
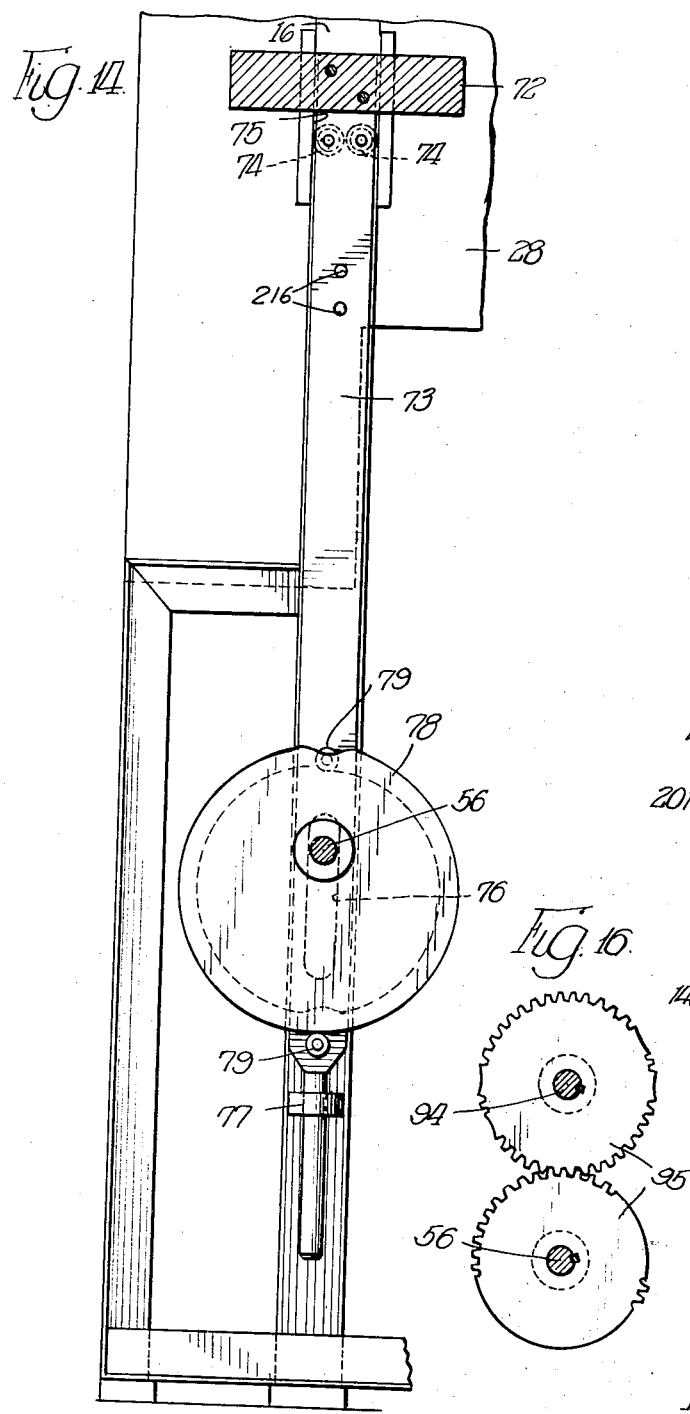
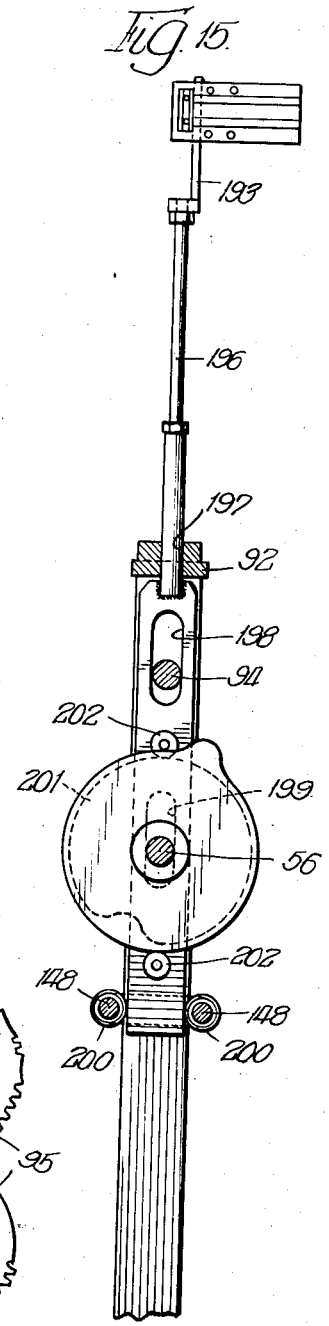
INVENTORS.
Hans A. Jensen,
Augustus H. Eberman,
By Cromwell, Greist & Warden
ATTYS.

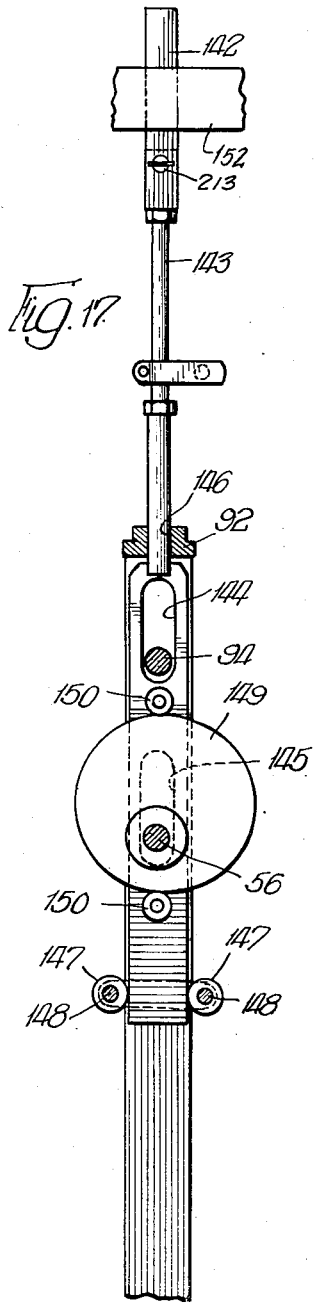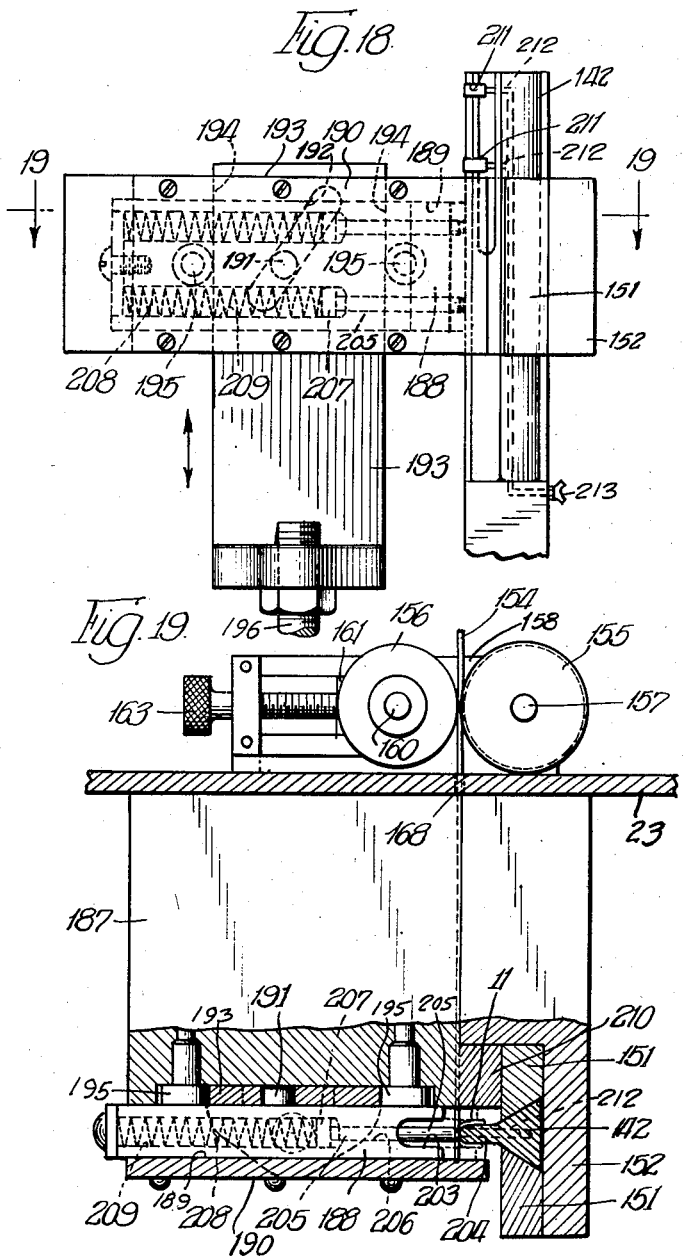

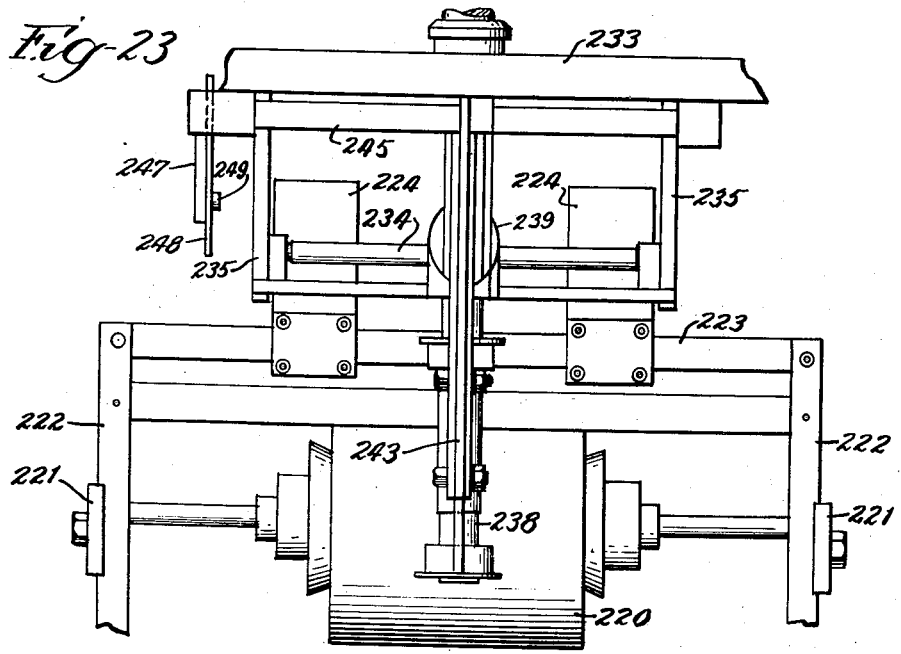
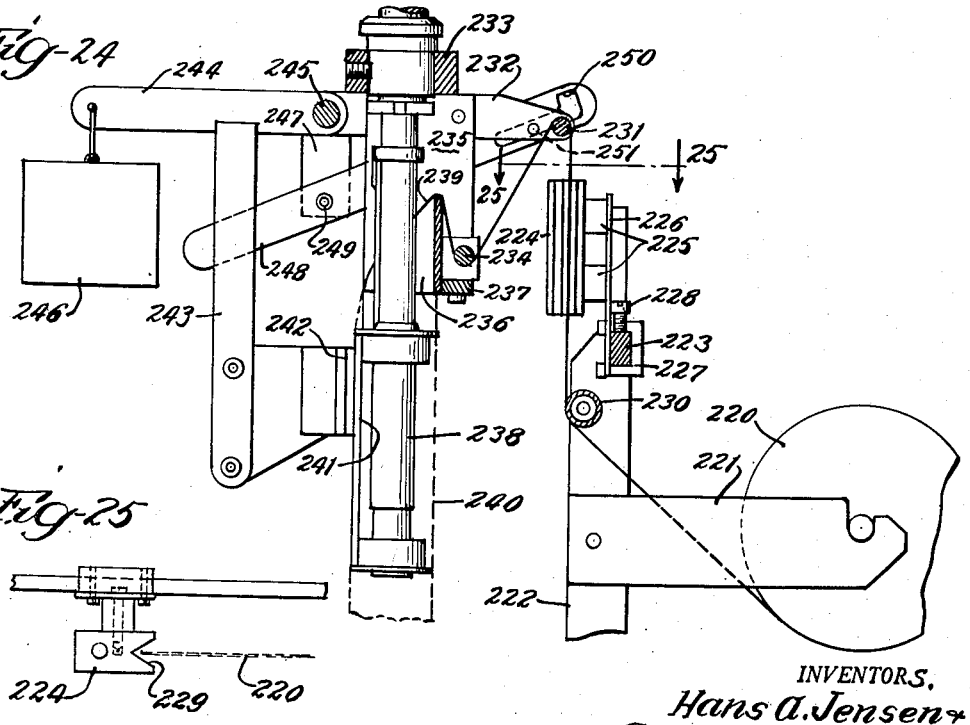
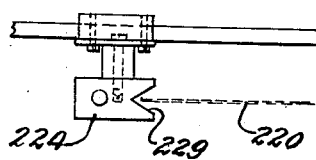
INVENTORS.
Hans A. Jensen +
Augustus H. Eberman.
By Cromwell, Greist + Warden
attys.

April 22, 1958     H. A. JENSEN ET AL     2,831,302
PACKAGING MACHINE
Filed Oct. 6, 1954     18 Sheets—Sheet 11
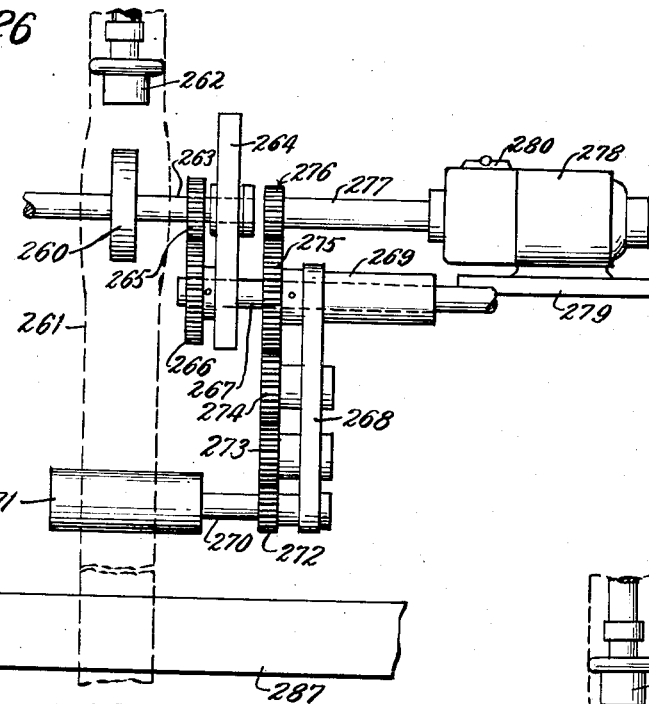
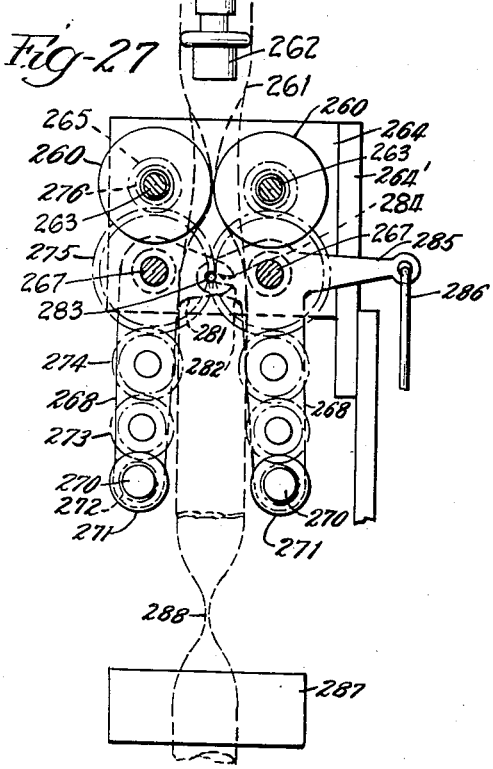
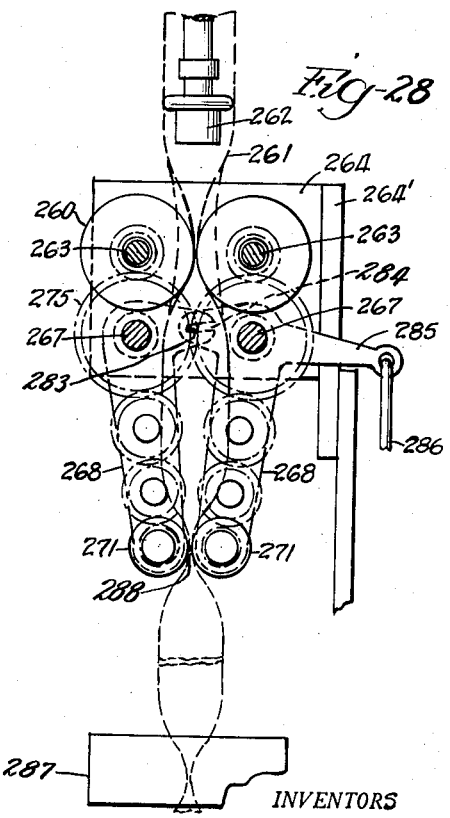
INVENTORS
Hans A. Jensen.
Augustus H. Eberman.
By Cromwell, Greist + Warden
Attys.

April 22, 1958 H. A. JENSEN ET AL 2,831,302
PACKAGING MACHINE
Filed Oct. 6, 1954 18 Sheets-Sheet 12
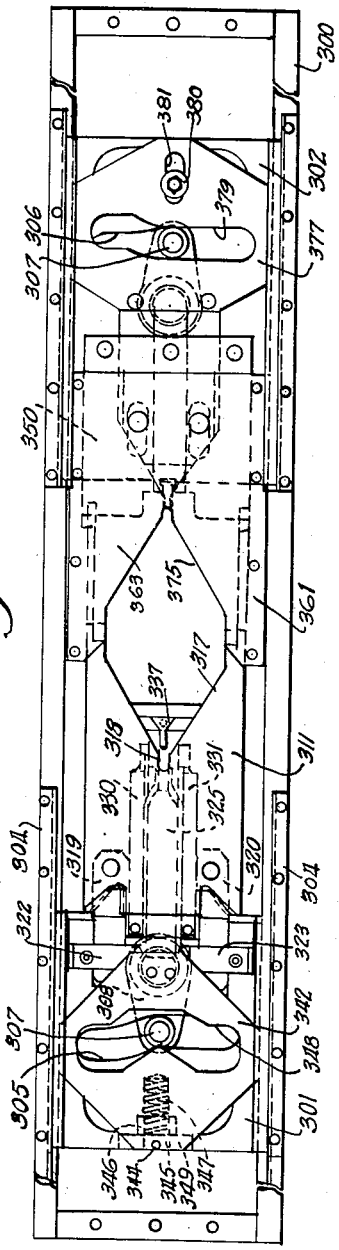
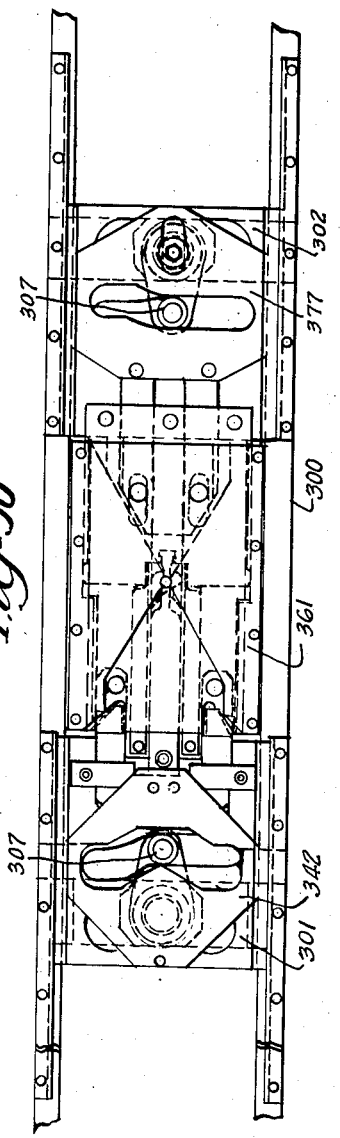
INVENTORS.
Hans A. Jensen &
Augustus H. Eberman.
By Cromwell, Greist & Warden
Attys.

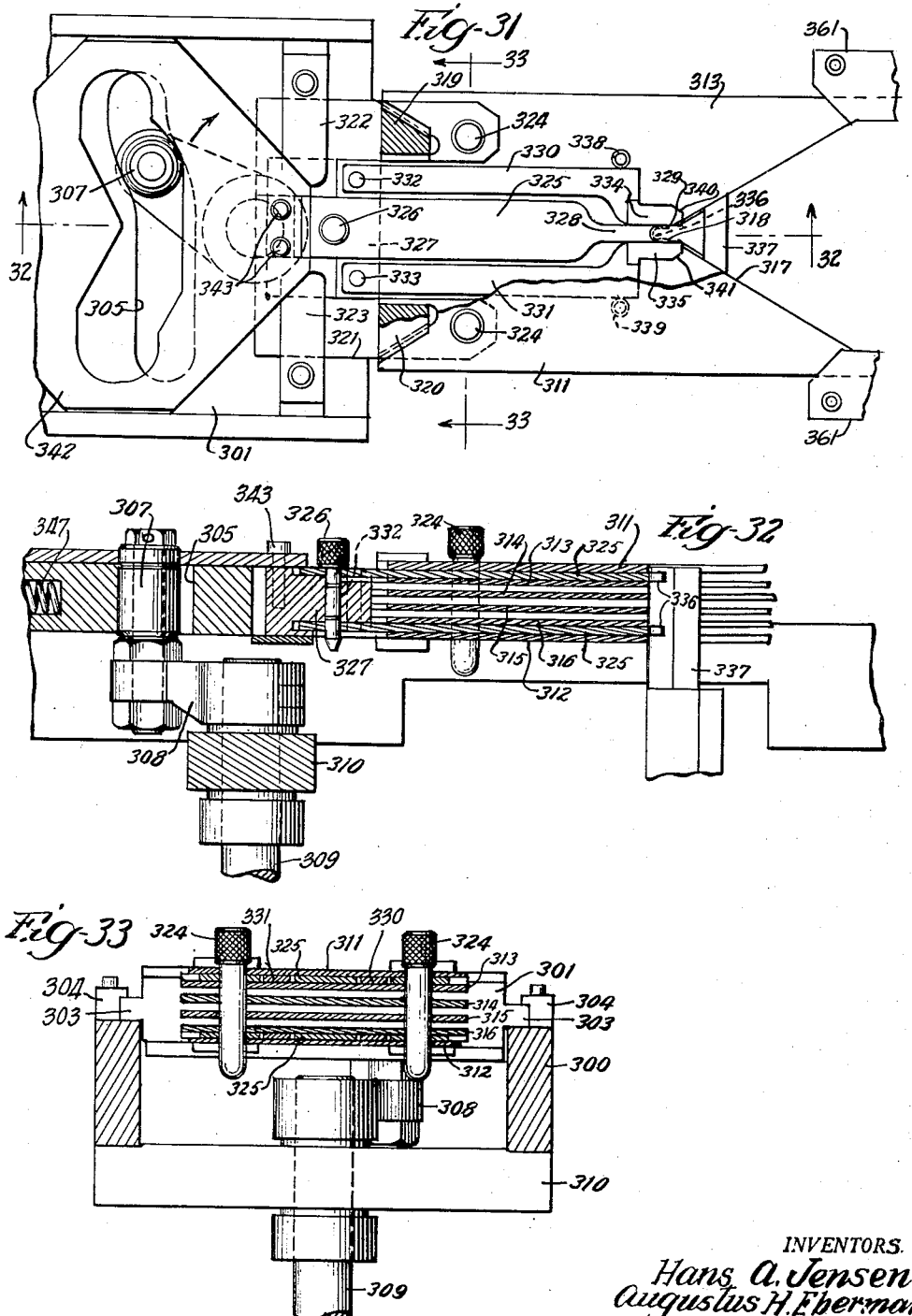

April 22, 1958 H. A. JENSEN ET AL 2,831,302
PACKAGING MACHINE
Filed Oct. 6, 1954 18 Sheets-Sheet 14
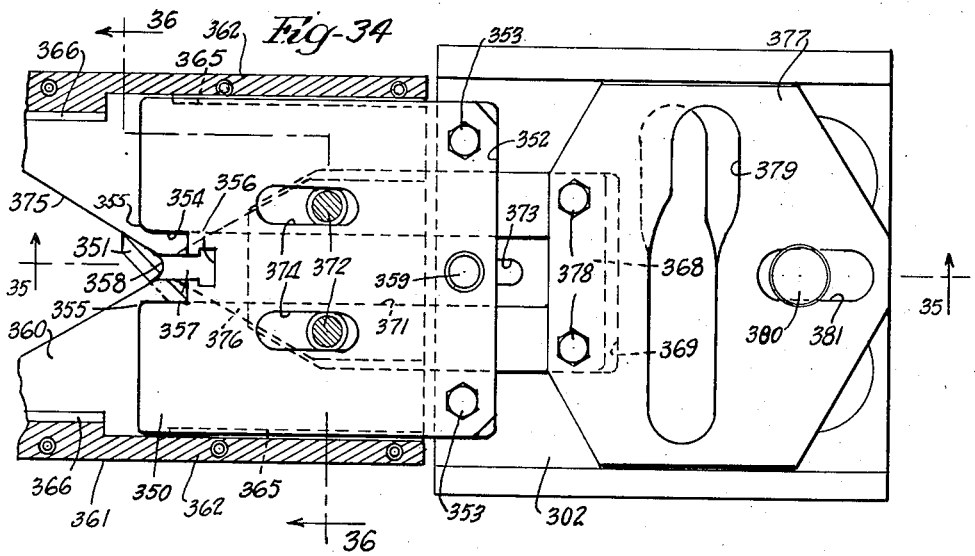
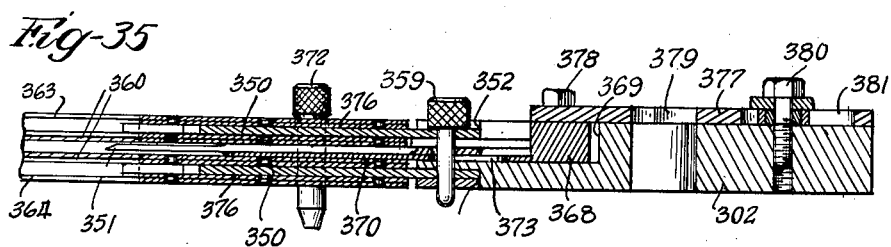
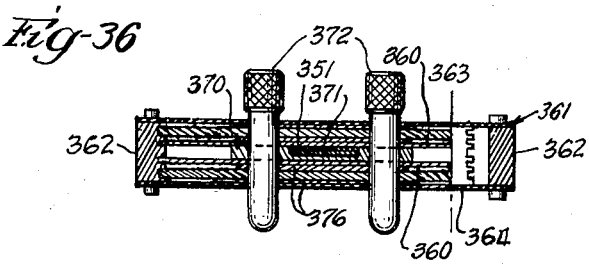
INVENTORS.
Hans A. Jensen &
Augustus H. Eberman.
By: Cromwell, Greist & Warden
Attys.

April 22, 1958 H. A. JENSEN ET AL 2,831,302
PACKAGING MACHINE
Filed Oct. 6, 1954 18 Sheets-Sheet 15
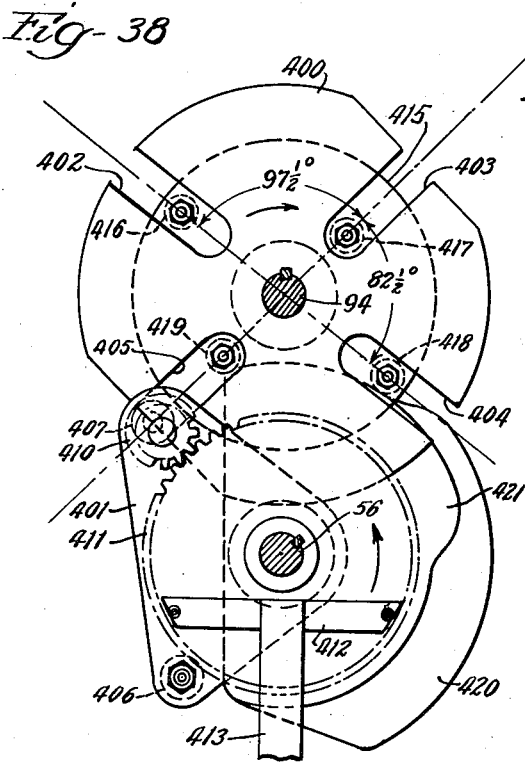
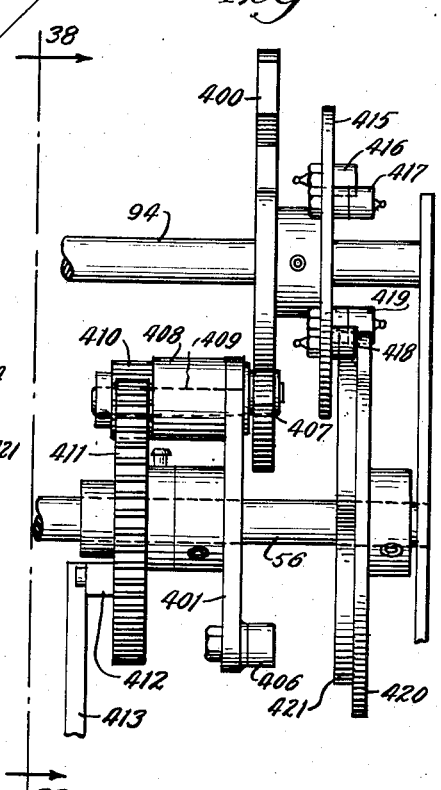
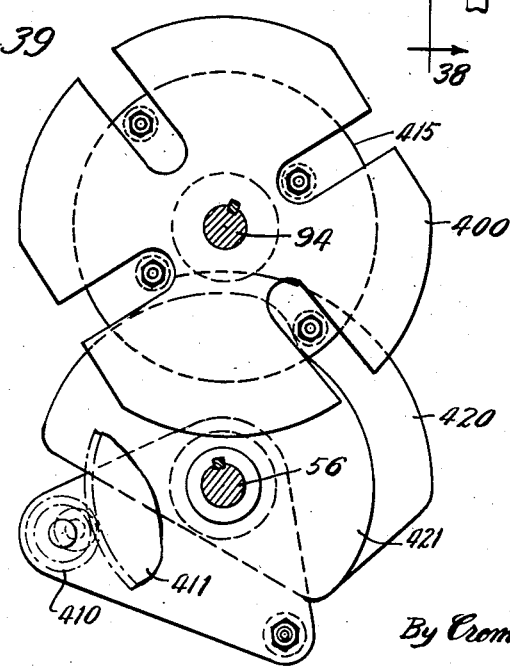
INVENTORS.
Hans A. Jensen &
Augustus H. Eberman.
By Cromwell, Greist & Warden
attys.

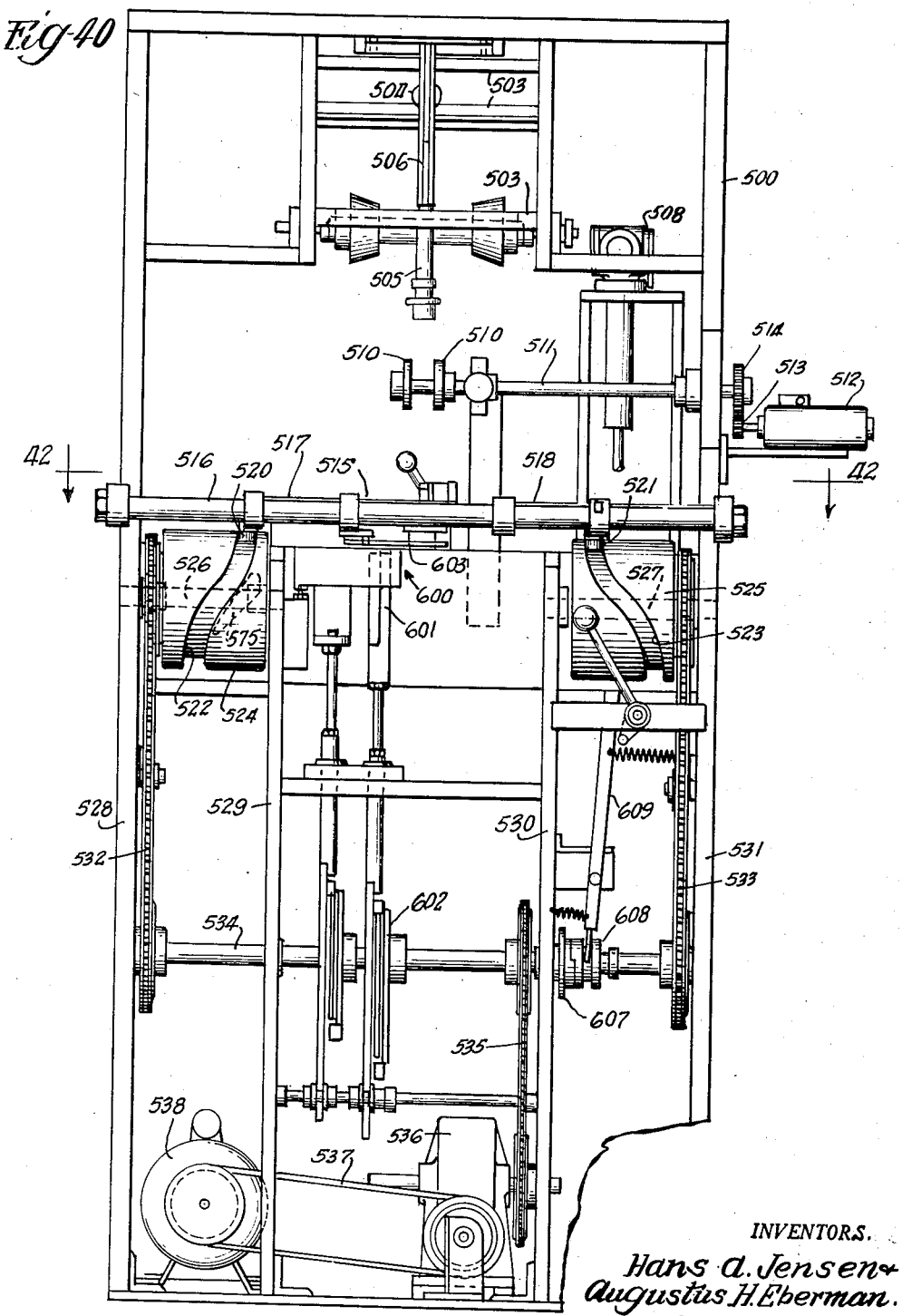

April 22, 1958   H. A. JENSEN ET AL   2,831,302
PACKAGING MACHINE
Filed Oct. 6, 1954   18 Sheets-Sheet 17

INVENTORS.
Hans A. Jensen +
Augustus H. Eberman.
By Cromwell, Greist + Warden
attys.

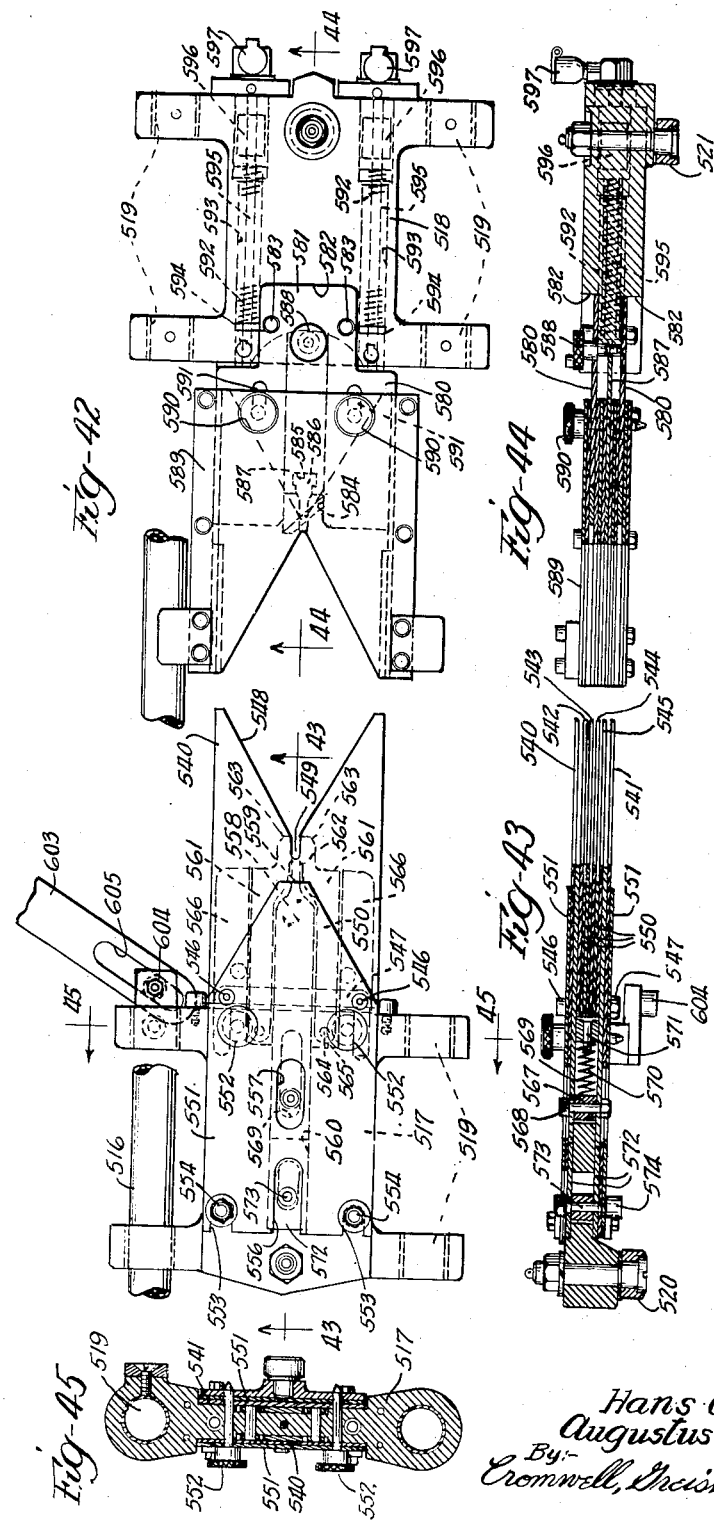

United States Patent Office 2,831,302
Patented Apr. 22, 1958

2,831,302

PACKAGING MACHINE

Hans A. Jensen and Augustus H. Eberman, Madison, Wis., assignors to Oscar Mayer & Co., Inc., Chicago, Ill., a corporation of Illinois Application October 6, 1954, Serial No. 460,731

51 Claims. (Cl. 53—138)

This invention relates to packaging machines and is more particularly concerned with improvements in a machine of the type which feeds material to be packaged into a continuous tube of relatively thin pliable material, and constricts, seals and severs the filled tube at intervals to divide the same into a plurality of separate individual packages.

This application is a continuation-in-part of application Serial No. 167,874 filed June 13, 1950, now abandoned.

It is a general object of the invention to provide a packaging machine of the type described which feeds material to be packaged into a continuously advancing tube of relatively thin pliable material, which divides the tube at predetermined spaced intervals by gathering the tube material and forming therein a constricted area, which provides axially spaced seal formations within the constricted area to form the top of one package and the bottom of the next succeeding package, and which severs the constricted portion of the tube between the seal formations to separate the successively formed packages.

It is a more specific object of the invention to provide a packaging machine for forming and continuously advancing a tube of relatively thin pliable material, which feeds material to be packaged into the tube, which divides the tube at regular intervals by gathering the tube material and forming therein a constricted area, which applies a pair of spaced closure members within the constricted area to form the top of one package and the bottom of the next succeeding package, and which severs the constricted portion of the tube between the closure members to separate the successively formed packages.

It is another object of the invention to provide a machine of the character described which is particularly adapted for use in packaging paste-like or semi-fluid materials by continuously forming a tube of film material around a hollow mandrel, feeding the material to be packaged through the hollow mandrel, constricting the tube at spaced intervals, forming and applying thereto successive pairs of metal closure bands simultaneously with the constricting of the tube in spaced relation on the constricted portions of the tube and severing the tube in the constricted area between the closure bands.

It is a further object of the invention to provide a packaging machine of the type described wherein a web of flexible sheet material is continuously fed axially of a hollow filling mandrel and formed into a tube, a continuous stream of material is delivered through the mandrel to the end of the moving tube, the tube material is gathered at spaced intervals to form a constricted area, two closely spaced closures are formed and secured in spaced relation around the constricted area and the tube is severed between the closures to provide successive individual tubular packages of the material which are closed at opposite ends by the closure members.

It is a still more specific object of the invention to provide a machine of the character described for forming from a web of flexible sheet material a continuous tube around a hollow mandrel through which the material to be packaged is delivered, for simultaneously forming pairs of U-shaped metal band members, for delivering the pairs of band members successively to a position adjacent the end of the filling mandrel, for constricting the tube at successive axially spaced areas, for moving the pairs of metal band members into spaced encompassing relation with the constricted portions of the tube, for clinching the band members to provide encircling closure members and for severing the tube between the metal closure members to provide individual packages.

It is another object of the invention to provide in a tube filling and closing machine of the type described, mechanism for applying a continuous tube of relatively thin pliable material around a hollow tubular mandrel, mechanism for continuously advancing the tube beyond the end of the mandrel, mechanism for continuously feeding the material to be packaged through the mandrel and into the continuously advancing tube, a self-contained constricting, sealing and severing unit mounted for reciprocation at regular intervals in the direction of advancing movement of the tube, which self-contained unit comprises means for constricting the moving tube along an extended area, means for severing the tube within the constricted area and means for sealing the constricted tube adjacent the severing point during the advancing movement of the unit to provide a plurality of successive individual packages, the unit being free from engagement with the tube as it is moved in the opposite direction, and means for controlling the material feeding mechanism to vary the amount of material in the packages.

It is another object of the invention to provide in a machine for continuously forming a series of packages, a hollow tubular mandrel, mechanism for applying a continuous tube of relatively thin pliable material in telescoped relation on the mandrel, means for feeding the material to be packaged through the mandrel, means for operating the material feeding means continuously and at uniform speed, mechanism beyond the end of the mandrel engageable with opposite sides of the tube while it is being filled for continuously advancing the tube, means for operating said tube advancing means continuously and at uniform speed, a self-contained constricting, sealing and severing unit mounted for reciprocation in the direction of axial movement of the tube, the self-contained units comprising means for constricting the advancing tube along an extended area, means for sealing the tube at spaced points along the constricted area, and means for severing the tube between the sealing points, means for reciprocating the unit periodically, and means for independently varying the speed of operation of the tube advancing means relative to the speed of operation of the unit to vary the size of the package.

It is still another object of the invention to provide a machine for solidly packaging a fluent material in a thin pliant skin-like casing wherein a tubular casing of thin pliant skin-like material is applied in telescoping relation around a hollow mandrel, the material to be packaged is fed in a continuous stream through the mandrel and into the tube as the tube is advanced beyond the end of the mandrel, a hollow box-like cross frame is slidably supported on spaced side frame members and extends across the path of advancing movement of the filled tube, and movable mechanism is provided within the frame for constricting the filled tube along an extended area, for severing the tube within the constricted area and for sealing the constricted tube adjacent the severing point to provide successive packages.

It is a further object of the invention to provide a packaging machine which comprises a hollow tube forming mandrel having associated therewith, mechanism for forming from a web of sheet material a continuous tube by folding the material around the mandrel and continuously applying a longitudinal seam to overlapping longitudinal margins of the same, pairs of cooperating feed rollers adjacent the end of the mandrel for continuously moving the tube beyond the mandrel, mechanism including a movable anvil for feeding metal strips and forming on the anvil successive pairs of U-shaped closures, mechanism for moving the anvil to deliver the successive pairs of closures into a position adjacent the end of the mandrel, mechanism adjacent the end of the mandrel for contricting the tube at longitudinally spaced areas and applying the U-shaped closures in spaced relation thereto while simultaneously severing the constricted tube between the closures to separate successive individual packages from the same.

It is another object of the invention to provide a machine for fabricating from a web of sheet material a series of connected packages wherein a reciprocable tube constricting and closure applying head is provided which includes a pair of oppositely disposed slidable carrier blocks arranged on opposite sides of the tube, the blocks each having thereon a plurality of plate members provided with V-shaped slots in the free ends thereof, and the plate members on each carrier block being arranged in spaced relation whereby the slotted ends thereof move in interleaved relation to constrict the tube when the blocks are moved toward each other.

It is another object of the invention to provide in a machine of the type described a reciprocable head for constricting the tube formation at spaced intervals and applying thereto a pair of spaced closure members in combination with a closure member forming mechanism which includes means for intermittently feeding a pair of strips of material suitable for fabricating the closure members, means for severing predetermined lengths of material from the strips, a forming anvil, means for bending the severed lengths of material around the anvil and into generally U-shaped clips and means for moving the anvil relative to the reciprocable head to transfer the preformed closure clips to the head for application to constricted areas of the tube formation.

It is another object of the invention to provide a machine for fabricating from a web of sheet material a series of connected packages which machine includes a reciprocable tube constricting head and a cooperating closure forming and applying mechanism, the constricting head being provided with a pair of oppositely disposed slidable carrier blocks arranged on opposite sides of the tube, the blocks each having thereon a plurality of plate members characterized by U-shaped slots in the free ends thereof, the plate members on each carrier block being arranged in spaced relation whereby the slotted ends thereof move in interleaved relation to constrict the tube when the carrier blocks are moved toward each other, and the closure forming and applying mechanism being arranged to intermittently feed a pair of strips of material suitable for forming the closure members, to sever lengths of material from the strips and simultaneously form the severed lengths of material into generally U-shaped clips around a movable anvil, which clips are thereafter transferred by movement of the anvil relative to the reciprocable head for application to constricted areas of the tube formation by cooperating clincher plates arranged between the spaced constricting plates on the movable carrier blocks.

It is a further object of the invention to provide in a packaging machine of the type described continuously driven feed rollers adjacent the end of the tube forming and filling mandrel which are arranged to engage the walls of the filled tube, to collapse the portion of the tube adjacent to the feed rollers and to continuously advance the tube toward the tube constricting and sealing unit, and an independently controlled adjustable drive connected to the feed rollers whereby to permit the tube to be advanced at varying rates of speed.

It is another object of the invention to provide in a packaging machine of the character described a mechanism which is operable in timed relation to the operation of the tube constricting and closure applying devices, and which will engage the filled tube at predetermined intervals and squeeze away the material in the areas to be constricted prior to the tube constricting and closure applying operations.

These and other objects of the invention will be apparent from a consideration of the machine which is shown by way of illustration in the accompanying drawings, wherein:

Fig. 3 is a perspective view of the tube forming and longitudinal seam sealing mechanism;

Fig. 4 is a perspective view showing portions of the tube feeding and constricting mechanisms;

Fig. 5 is a view taken generally on the lines 5—5 of Fig. 2 to an enlarged scale showing the top of the constricting mechanism in the closed position;

Fig. 6 is a longitudinal section taken generally on the lines 6—6 of Fig. 5, to an enlarged scale, and in open position;

Fig. 7 is a detail section taken generally on the line 7—7 of Fig. 5 to an enlarged scale;

Fig. 8 is a view taken as in Fig. 5 with the constricting mechanism in open position;

Fig. 9 is a view similar to Fig. 8 with the top plates of the constricting mechanism removed;

Fig. 10 is a detail sectional view taken generally on the line 10—10 of Fig. 5 to an enlarged scale illustrating the operation of the tube constricting and closure applying mechanism with portions of the tube being shown;

Fig. 11 is a section taken generally on the lines 11—11 of Fig. 10;

Fig. 12 is a detail section taken generally on the line 12—12 of Fig. 10;

Fig. 13 is a detail section taken generally on the line 13—13 of Fig. 10;

Fig. 14 is a sectional view taken on the line 14—14 of Fig. 2 to an enlarged scale;

Fig. 15 is a sectional view taken on the line 15—15 of Fig. 2 to an enlarged scale;

Fig. 16 is a sectional view taken on the line 16—16 of Fig. 2 to an enlarged scale;

Fig. 17 is a sectional view taken on the line 17—17 of Fig. 2 to an enlarged scale;

Fig. 18 is an enlarged detail elevation of the closure band preforming mechanism;

Fig. 19 is a section taken generally on the line 19—19 of Fig. 18;

Fig. 20 is a detail view to an enlarged scale of the mechanism for feeding the strips of material for fabricating the closure bands;

Fig. 21 is a detail view taken generally on the line 21—21 of Fig. 20;

Fig. 22 is an elevation of the package produced by the machine;

Fig. 23 is a fragmentary front elevation showing a modified mechanism incorporated in the machine for heating the edges of the film and guiding it around the mandrel;

Fig. 24 is a side elevation of the mechanism shown in Fig. 23;

Fig. 25 is a fragmentary section on the line 25—25 of Fig. 24;

Fig. 26 is a fragmentary front elevation showing a modification in which a tube squeezing mechanism is provided between the end of the mandrel and the tube constricting device;

Fig. 27 is a side elevation of the mechanism shown in Fig. 26 with the tube squeezing rollers in open position;

Fig. 28 is a view similar to Fig. 27 with the tube squeezing rollers in closed position;

Fig. 29 is a plan view of a modified form of tube constricting and closure applying mechanism, with the constricting members retracted or in the open position;

Fig. 30 is a partial plan view similar to Fig. 29 with the constricting members in the closed position;

Fig. 31 is a fragmentary plan view, to an enlarged scale, of one end of the mechanism of Fig. 29;

Fig. 32 is a cross section taken on the line 32—32 of Fig. 31;

Fig. 33 is a cross section taken on the line 33—33 of Fig. 31;

Fig. 34 is a fragmentary view to an enlarged scale, of the other end of the mechanism of Fig. 29, with portions broken away;

Fig. 35 is a cross section taken on line 35—35 of Fig. 34;

Fig. 36 is a cross section taken on line 36—36 of Fig. 34;

Fig. 37 is a front elevation of a modification of a portion of the drive mechanism for operating the tube constricting and closure applying mechanism;

Fig. 38 is a view taken on the line 38—38 of Fig. 37;

Fig. 39 is a view similar to Fig. 38 with the drive members shown at a different stage in their cycle of operation;

Fig. 40 is a front elevation of a further modified form of the machine;

Fig. 42 is a view taken on the line 42—42 of Fig. 40;

Figure 1:
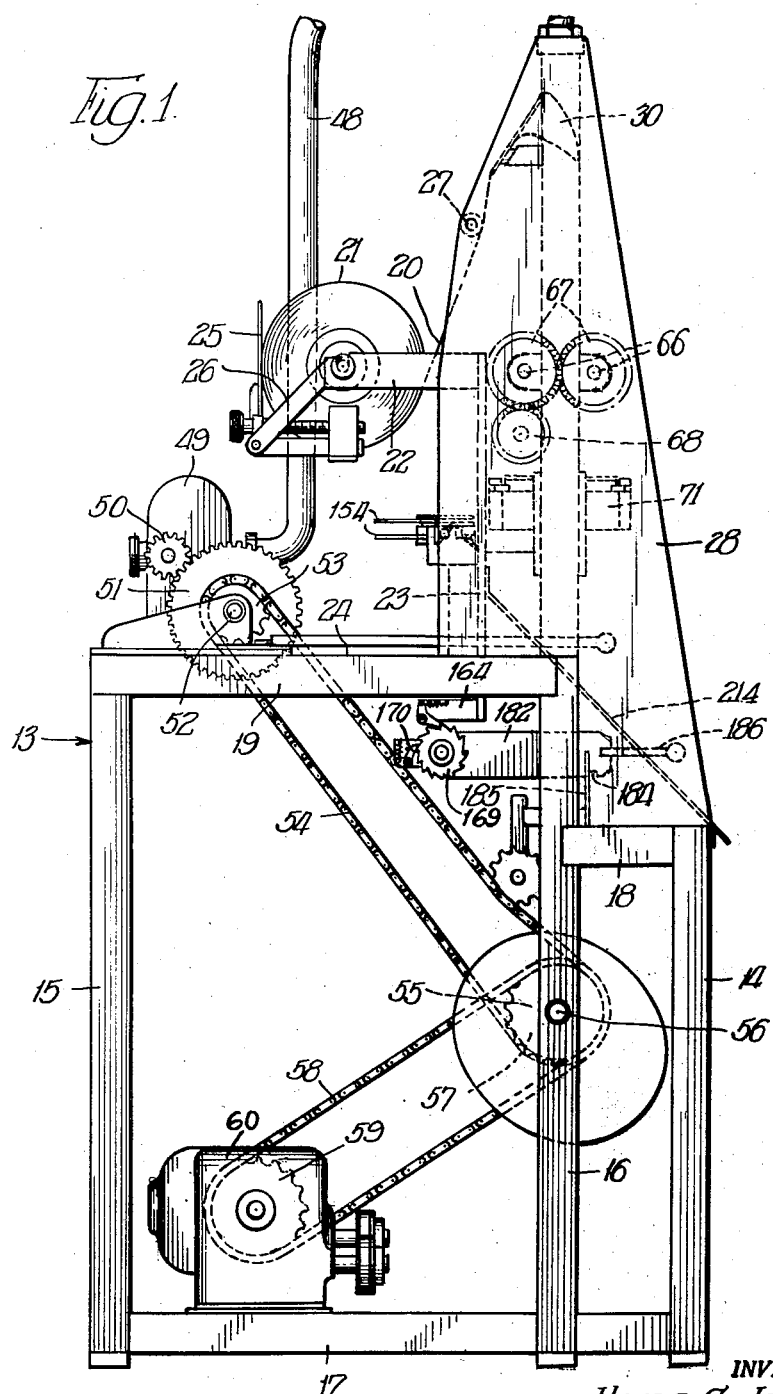
Fig. 1 is a side elevation of a machine embodying the principles of the invention.

Figs. 43 and 44 are sectional views taken on the lines 43—43 and 44—44 of Fig. 42; and Fig. 45 is a sectional view taken on the line 45—45 of Fig. 42.

Referring now to Figs. 1 to 21 of the drawings there is illustrated a machine having embodied therein the principal features of the invention and which is particularly adapted to fabricate a package of generally tubular shape having its opposite ends gathered and closed by encircling metal bands or closure clips, as illustrated in Fig. 22, the packages 10 being formed by the machine in a continuous connected string or series of predetermined size or length and being separated into individual packages by severing between the end closure bands 11 on the lines indicated at 12 simultaneously with the gathering of the material and the application of the closure bands 11 or by severing the same at a later time, as desired.

The machine of Figs. 1 to 21 is supported on a generally rectangular upstanding frame 13 (Figs. 1 and 2) which comprises a front frame formation 14, a back frame formation 15 which is somewhat higher and an intermediate frame 16 located closer to the front frame 14 than to the back frame 15 and extending substantially above both front frame 14 and back frame 15. The frames 14, 15 and 16 are tied together by oppositely disposed pairs of side frame members 17, 18 and 19. The side frame members 17 are at the bottom of the frame 13 while the side frame members 18 and 19 form the ends of transversely extending front and rear shelf formations, the front shelf being rather narrow and the rear shelf being substantially wider for supporting portions of the operating mechanism.

The material for forming the package 10 preferably is supplied in the form of a continuous web or film 20 from a supply roll 21. A film such as "Saran," "Pliofilm" polyethylene or similar material which will form a thin pliant skin-like casing is suitable, the illustrated machine being particularly adapted to use "Saran" which has properties especially desirable in the packaging of meat and similar products where it is important to retain the flavor of the material in the package. The roll 21 is supported on rearwardly directed brackets 22 which are attached to the vertical cross frame plate member 23 which extends upwardly from the cross frame 24 between the side plates 19 to the rear of intermediate frame 16.

A brake 25 is mounted on supporting arms 26 at the ends of the brackets 22 which engages the roll 21 and provides tension in the web 20 as it is fed from the roll 21 and through the machine.

The tube forming material 20 passes under a guide bar 27 (Figs. 1 to 3) which extends transversely of the machine between the vertical side plates 28 which are arranged along the sides of the intermediate frame 16 and which extend downwardly to the front and rear shelf formations. From the guide bar 27 the material 20 passes upwardly and over a curved forming plate 30 and down around a tubular filling mandrel 31. The hollow mandrel 31 extends vertically through the top cross bar 32 forming part of the intermediate frame 16. The forming plate 30 is cut and shaped to form a collar around the mandrel 31 which reverses the direction of the web 20 and guides the edges thereof downwardly into overlapping tube forming relation around the mandrel 31. The forming plate 30 is secured on a cross bar 33 which is supported from the top cross bar 32 by the hangers 34.

The web of material 20, guided by the plate 30 forms a continuous tube with overlapping edges which are continuously sealed by a sealing mechanism indicated at 35. When the package is formed of "Saran" or material having similar seal forming characteristics the seam formed by the overlapping edges of the web is sealed by electronic sealing mechanism which comprises a pair of cooperating electrodes 36 and 37. Electrode 36 is positioned vertically within the tube formation along an enlarged portion of the filling mandrel 31. Electrode 37 is mounted on a depending angle arm 38 which is pivotally secured at 39 to the top cross bar 32. The sealing arm 38 is provided with a control weight 40 having a slot 41 for engaging over the attaching bar 42 which extends forwardly of the top part of the arm 38 and having an adjusting and securing screw 43 to provide as much pressure as desired between the electrodes 36 and 37. The electrodes 36 and 37 are connected with suitable electronic apparatus to provide a continuous seal between the overlapping edges of the web 20 and form the tube 44 which moves downwardly between cooperating pairs of feed rollers 45 disposed on opposite sides thereof immediately below the forming and filling mandrel 31.

The bottom end 46 of the filling mandrel 31 terminates at a ring 47 which is of sufficient diameter to frictionally engage the interior surfaces of the tube 44 and to form a barrier against upward pressure of the material being packaged. The latter may be, for example, a meat product in paste-like form such as liver sausage. The mandrel 31 is connected by a supply tube 48 with a pump 49 supported on the cross frame 24 and driven by the pinion 50 which meshes with gear 51 on a transverse stub shaft 52, also supported on frame 24, which is connected in driving relation by sprocket 53 and chain 54 with sprocket 55 on the main cam shaft 56. The cam shaft 56 extends transversely of the machine and is supported on the intermediate upright frame 16. Shaft 56 is connected by sprocket 57 and chain 58 with the pinion 59 on a speed reducer 60 which is driven by means of pulley 61 and belt 62 from the pulley 63 on the main motor 64. The motor 64 and speed reducer 60 are supported on a plate 65 extending transversely between the bottom side frame members 17. The pump is driven continuously and its speed may be adjusted by changing gears 50, 51 or it may be provided with other suitable adjustment (not shown) to control or vary the volume of the material delivered from the nozzle 46 to the tube 44. The volume of material delivered to the tube per unit of tube length depends, of course, upon the speed with which the tube 44 is advanced and the volume of material delivered through the nozzle 46 by operation of the pump 49. Proper adjustment of the pump 49 and the speed of the tube feeding rollers 45 provides the quantity of material desired in the individual packages 10.

The pairs of feed rollers 45 are mounted on parallel transverse shafts 66 which are journaled in brackets attached to the frame members 16 and which shafts are connected in driving relation by a pair of gears 67 on the one end. One gear 67 meshes with a driven pinion 68 on the power output side of the motor drive unit 69 which is supported on brackets 70 extending outwardly of the one side plate 28. The tube 44, after passing the barrier ring 47 tends to flatten out and the rollers 45 engage in paired relation with oppositely disposed portions of the walls of the filled tube and form flattened folds on opposite sides of the tube, thereby positively feeding the tube 44 continuously, the speed of advance of the tube being determined by controlling the speed of the motor drive unit 69. The power drive unit 69 preferably includes a manually adjustable variable speed mechanism indicated at 69', which is of the type illustrated in Patent No. 2,405,957, and which permits independent adjustment of the speed of the feed rollers 45 while the machine is in operation without disturbing any of the other operating members. With this adjustment the length of the package may be varied in a manner which will be subsequently described.

A tube constricting or gathering and sealing head 71 is mounted for vertical reciprocation below feed rollers 45. The head 71 comprises a transversely extending generally rectangular frame 72 which is provided at opposite ends with depending supporting posts or arms 73 (Figs. 2 and 14) extending generally vertically and located inwardly of the side members of intermediate frame 16. Adjacent the top of the posts 73 pairs of anti-friction rollers 74 are journaled for operation in a guide channel formation 75 provided on the frame members 16 which guides the head 71 in its reciprocable vertical movement. The side posts 73 extend downwardly and the lower portion of each post is slotted at 76 (Fig. 14) to receive the cam shaft 56. The lower end of each post 73 is guided in an apertured guide plate 77 secured on the frame 16 below the cam shaft 56. The posts 73 are reciprocated by means of double plate cams 78 and cooperating upper and lower cam rollers 79 and 79' to provide positive reciprocation of the head 71 which is moved with the tube 44 in the direction of the travel of the tube during the tube constricting and closing operation.

The head 71 comprises mechanism for constricting the tube formation 44 at predetermined spaced intervals and for simultaneously positioning and clinching around the constricted area, in spaced relation, a pair of closure bands or clips 11 which are preformed and delivered to the head 71 in timed relation to the movement of the constricting mechanism. The head 71 includes oppositely disposed end blocks 80 and 81 (Figs. 5 to 13) which are slidably mounted in an identical manner in the frame 72, each of the blocks being provided along its side edges with guide strips 82 (Fig. 7) and the frame 71 being provided with recessed guideway forming strip portions 83 which are secured thereto by bolts 84. The guide strips 82 extend into the guide recesses permitting the blocks 80 and 81 to slide toward and from each other.

The end blocks 80 and 81 are provided with cam grooves or slots 85 and 86, respectively, and each cam groove is adapted to receive a cam roller 87 on the end of a cam arm 88 which extends radially from the top of a vertical shaft 89. Each shaft 89 is journaled at the top in a cross bar 90 (Fig. 2) secured beneath the frame 72 and extends at the lower end in suitably splined relation through a beveled pinion 91 which is journaled in a cross bar 92 forming a lower part of the intermediate frame 16. The pinion 91 meshes with beveled pinion 93 on a transverse shaft 94 which is driven from the cam shaft 56 by a pair of mutilated gears 95. The transverse shaft 94 is journaled in a pair of spaced vertical members 96 at the lower end of frame 16 beneath the cross frame member 92. The mutilated gears 95 (Fig. 16) are arranged with the proper teeth to provide the movement of the end blocks 80 and 81 in the cross frame 72 of the head 71 as required.

The end block 80 is provided with a plurality of relatively thin laterally projecting plate members (Figs. 5 to 10) including top and bottom cover plates 97 and 98, a center plate 99 and two intermediate plates 100 and 101 above and below the center plate 99. Each of the plates is provided with an outwardly opening V-shaped groove 102 on the free end thereof. The top and bottom plates 97 and 98 are primarily cover plates and are removably secured by a plurality of bolts 103 to the block 80. Top and bottom clincher plates 104 are provided for longitudinal sliding movement between top and bottom plates 97 and 98 and the next adjacent plates 100. The clincher plates 104 are identical and are secured in recesses on the top and bottom of a relatively small sliding block 105 which moves in a relatively large slot 106 provided in the end block 80. The small sliding block 105 is provided with top and bottom cam plates 107 which slide in recesses on the top and bottom of end block 80 which connect the slot 106 with the cam slot 85. The ends of the cam plates 107 are engaged by the cam roller 87 which moves in cam groove 85. The clincher plates 104 are reduced in thickness at the free end and provided with a clinching recess 108. They are also provided with a longitudinal slot 109 adjacent the free end to accommodate the bolt 110 which ties together all the plates secured to the end block 80. Side guideway forming and spacer plate members 111, which are triangular in shape, are secured in recesses in the blocks 80 by set screws 112 and serve as guideways for the clincher plates 104 and also as separators between top and bottom plates 97, 98 and the adjacent intermediate plates 100. A compression spring 113 between the bolt 110 and the outer end of slot 109 urges the clincher plates 104 into retracted position. The intermediate plates 100, 101 and center plate 99 are separated from each other by spacer plates 114 which are triangular in shape and which extend from the end block 80 toward the V-shape groove 102 in the free ends of the plates. The spacer plates 114 are slotted or apertured as required to clear springs 113 and bolt 110. The central plate 99 is slotted longitudinally and centrally at 115 (Fig. 13) to accommodate the knife 116 which reciprocates in the slot 115 and which is secured at its outer end to the block 105. The knife 116 is slotted centrally to accommodate the tie bolt 110 and provided with a diagonal beveled cutting edge 117. Engagement of the cam plates 107 by the cam roller 87 moves the block 105 inwardly toward the center of the head and reciprocates the clincher plates 104 and the knife 116 relative to the remainder of the head. Relatively small guide plates 118 attached to top and bottom plates 97, 98 and the next adjacent intermediate plates 100 serve as baffles to prevent bulging of the constricted tube and also as guides on opposite sides of the reduced ends of the clincher plates 104 and insure proper sealing of the closure bands 11 in the clinching grooves 108 in the ends of the clincher plates 104.

The other end block 81 in the head 71 is provided with tube constricting plates and closure clinching plate mechanisms which cooperate with the constricting plates 97, 98, 99, 100 and 101 and clincher plates 104 on the end block 80 to constrict the tube and apply the closure clips 11. The constricting plates on the block 81 include top and bottom plates 119 and 120 which are attached to the end block 81 by screws 121 and six intermediate plates 122 which are arranged in spaced relation between the top and bottom plates 119 and 120 and which are adapted to move between and interleave with the plates 97, 98, 99, 100 and 101 when the end blocks 80 and 81 are moved toward each other. Top and bottom clincher plate mechanisms 123 are arranged in the space provided between the top and bottom plates 119 and 120 and the next adjacent intermediate plate 122.

The clincher plate mechanisms 123 (Figs. 6, 9 and 12)

each comprises a center plate 124 and a pair of oppositely disposed side plates 125. The center plate 124, which constitutes a combination anvil and ejector plate, is attached at the outer end to a small movable block 126 slidably mounted in a slot or recess 127 provided in the end block 81. The inner or free end of the center plate 124 is provided with a narrowed portion 128 (Fig. 12) which is of a width approximately the same as the outside diameter of the closure band 11, when the latter is closed on the tube. The end of the narrow portion is curved at 129 to conform to the curvature of the closure band 11. The center plate 124 is slotted at 130 to accommodate the tie bolt 131 extending through all of the plates attached to the end block 81. The side plates 125 engage generally rectangular fixed guide plates 132 disposed on opposite sides thereof and attached to the end block 81. The side plates 125 are generally rectangular with widened portions 133 at the inner ends which are arranged to provide opposed edges adapted to receive in the space between them the narrowed end portion 128 of the center plate 124. The outer edges of the side plates 125 are in sliding relation with the inner edges of the guide plates 132. Leaf springs 134 seated in recesses in the inner edges of the guide plates 132 tend to urge the widened end portions 133 of the side plates 125 towards the narrowed end 128 of the center plate 124, the body of the latter being somewhat narrower than the space between the inner edges of the side plates 125. Compression springs 135 extend between the block 126 and the outer ends of the side plates 125 which resist rearward movement of the plates 125 as the inner ends of the same are engaged by the inner ends of the clincher plates 104. The top and bottom plates 119 and 120 are spaced a sufficient distance from the next adjacent intermediate plates 122 to accommodate the clincher plate mechanisms 123. The intermediate plates 122 are separated from each other by triangular spacer plates 136 which are connected to the end block 81 and extend toward the inner ends of the constricting plates. The inner ends of all the constricting plates 119, 120 and 122 are provided with V-shaped slots 137 opening inwardly of the head and terminating in a pocket formation 138. A compression spring 139 is seated in the slot 127 in the end block 81 and extends between the outer ends of the constricting plates and the movable block 126 tending to hold the clincher plate mechanisms 123 in retracted position. A cam roller 140 is mounted on the movable block 126 and is adapted to be engaged by a cam plate 141 mounted on the cam roller arm 88 above the cam roller 87. The cam plate 141 is moved by the arm 88 to strike the cam roller 140 at the proper time to move the end 129 of the center or ejector plate 124 forward when the clincher plates 104 engage the ends of the side plates 125, upon movement of the end blocks 80 and 81 toward each other. The side plates 125 are retracted somewhat against the resistance of springs 135 when they are engaged by the clincher plates 104. When the two halves of the head separate, the movement of the center ejector plate 124 by spring 139 and of side plates 125 by springs 135 tends to eject the clinched closure member 11 and prevent it from being pulled back with that half of the restricting head.

The closure bands 11 are preformed into generally U-shape and delivered to the head 71 by mechanism which includes a vertically reciprocating anvil member 142 (Figs. 2, 17 to 21). The anvil 142 is mounted on the top of a reciprocating rod 143 which is slotted at 144 to accommodate the cross shaft 94 and at 145 to receive the cam shaft 56. The rod 143 extends through a guide aperture 146 in the cross bar 92 and at its lower end between a pair of guide rollers 147 on cross shafts 148 extending between vertical frame members 96. The rod 143 is reciprocated vertically by means of the cam 149 on the cam shaft 56 and cooperating upper and lower follower rollers 150 on the rod 143. The anvil member which is generally triangular in cross section is guided for movement between a pair of spaced guide plates 151 forming a trackway and secured to a supporting block 152 extending forwardly from the vertical supporting plate 23.

The material for forming the closure members 11 is supplied in strips of the proper size from a roll or other source. Preferably strips of aluminum or similar relatively rigid bendable material are employed. The strips 154 pass between a pair of feed rollers 155 and 156. Feed roll 155 is mounted on the upper end of a shaft 157 which is journaled in a bracket 158 extending rearwardly of vertical frame plate 23. The roll 155 is provided with spaced grooves 159 for accommodating the metal strips 154 which are of a suitable cross section for forming the closure clips 11. The roll 156 is mounted on a short shaft 160 which is journaled in a sliding bearing block 161 which is spring loaded and retractable relative to roll 155 on the bracket 158 by means of a screw 163 to permit initial insertion of the strips 154. The shaft 157 is journaled at its lower end in a bracket 164 extending rearwardly of frame plate 23 and is provided with a beveled gear 165 which meshes with a beveled gear 166 on a cross shaft 167 which is journaled in bearing ears 168 depending from the bracket 164. The shaft 167 is rotated intermittently to feed the metal strips 154 which extend through apertures 168 in the plate 23 to a position in front of the forming anvil 142. The shaft 167 is rotated by means of a ratchet wheel 169 on the one end thereof and a dog 170 which is pivotally mounted at 171 on an operating plate 172 and urged into engagement with the ratchet wheel 169 by means of a tension spring 173 connected at one end to the plate 172 and at the other end to an arm 174 on the dog 170. The plate 172 is journaled on the cross shaft 167 and is swung or reciprocated by the vertical rod 143 which carries the anvil 142. The rod 143 is provided with a laterally extending bracket 175 which carries a pin 176 at the end thereof. The pin 176 operated in a slot 177 in the end of the plate 172 so that reciprocating movement of the anvil rod 143 oscillates or swings the plate 172 about the shaft 167 and intermittently rotates the shaft the proper amount to feed sufficient stock of the strips 154 for the formation of successive pairs of closure members 11. A holding dog 178 is pivoted on the end of bracket 164 projecting rearwardly of the frame plate 23 and is urged toward the ratchet 169 by a tension spring 180 attached at one end to bracket 164 and at the other end to an arm 181 on the dog 178 to prevent reverse movement of the ratchet wheel 169.

A release or throw-off device for the strip feed is provided which comprises a plate 182 slotted at 183 to receive the shaft 167 and positioned between the ratchet wheel 169 and plate 172 to engage at its end, when moved rearwardly, with the dog 170 for holding the same out of engagement with the ratchet wheel 169. The release plate 182 extends forwardly (Fig. 1) and is provided at its forward end with a series of spaced slots 184, on its lower edge, which are adapted to engage with a keeper plate 185 projecting upwardly from the frame of the machine. A handle 186 on the plate 182 facilitates operation of the same.

The closure members 11 are formed into generally U or V-shape by a strip severing and forming mechanism mounted in opposed relation to the anvil member 142 on a bracket 187 extending forwardly of the vertical frame plate 23. The forming mechanism comprises (Figs. 18 and 19) a horizontal reciprocating plate member 188 which is mounted in an operating trackway 189 in the bracket 187 and which is held in position therein by a cover plate 190. The forming plate 188 is reciprocated laterally of the bracket 187 by means of a cam pin or roller 191 which extends into a diagonal cam slot 192 in a vertically reciprocating plate 193 mounted in a guideway forming slot 194 in the bracket 187. The guideway slot 194 is provided with anti-friction rollers 195. The vertically reciprocating plate 193 is mounted on the upper end of a reciprocating cam rod 196 (Fig. 15) which extends downwardly through an aperture 197 in the cross guide plate 92. The rod 196 is provided with a slot 198 for accommodating cross shaft 94 and a slot 199 for receiving the cam shaft 56. At its lower end the rod 196 extends between a pair of guide rollers 200 which are mounted on the cross shafts 148. The rod 196 is reciprocated vertically by a pair of cam plates 201 on the cam shaft 56 and cooperating upper and lower cam rollers 202 on the rod 196. The cam plates 201 are adjusted to provide reciprocation of the plate 193 in proper timed relation with the movement of the forming anvil 142. The forming plate 188 is provided with a forming recess 203 on the edge thereof shaped to cooperate with a narrow vertical edge portion 204 on the anvil 142 to form a pair of closure members 11 around the same. Vertically spaced punch or ejector members 205 are arranged in bores 206 which communicate with the recess 203 on the edge of the forming plate 188, the ends of the ejector members 205 extending into the recess 203. The other ends of the ejectors 205 are headed at 207 and compression springs 208 in enlarged bores 209 urge the ejectors 205 toward the anvil 142 to prevent return of the preformed closure members 11 upon return movement of the forming plate 188. The one forward edge of the plate 188 cooperates with the edge of a block 210 on one of the guide members 151 to sever the strips 154 providing the proper length of material for formation of the closure clips 11. The end of the cover plate 190 serves as a stop for limiting the feeding movement of the ends of strips 154. The forward portion 204 of the mandrel 142 is preferably grooved at 211 to provide a seat for the closure members 11. The shape of the forward portion 204 of the mandrel and the cooperating recess in the plate 188 are such that the closure members 11 are formed about the mandrel 142 with very nearly parallel sides or legs. However, the mandrel 142 and the recess 203 may be so shaped that the legs of the partially formed closure members will not be parallel but will diverge somewhat. The mandrel 142 is preferably provided with passageways 212 which open into the grooves 211 and a connecting passageway terminating in a coupling 213 adapted to be connected to a suitable air pressure line and a suitable vacuum line in order that alternate vacuum and air pressure may be employed and the clips 11 will be held in position on the mandrel 142 by operation of the vacuum until delivered to the head 71 and thereafter they will be fully released from the mandrel 142 by application of air pressure.

The mandrel 142 and the closure forming plate 188 are operated in timed relation with the movement of the end blocks 80 and 81 in the head 71 so that successive pairs of closure clips 11 are formed around the mandrel 142 and carried by the same upwardly into proper alignment for removal from the mandrel 142 when the end block 81 is moved to position the slotted constricting plates so that the edge portion 204 of the mandrel 142 is seated in the ends 138 of the slots 137 with the preformed closure members 11 in front of the clincher plate mechanisms 123 in proper position to be carried towards the tube 44 as the same is constricted by movement of the two halves of the head toward each other. The end block 81 is moved forwardly to position the edge portion 204 of the mandrel 142 in the slots 138 of the plates and the movement is then stopped for a sufficient length of time to permit the mandrel 142 to descend below the head 71. Thereafter the end blocks 80 and 81 are moved toward each other to the limit of the constricting position of the cooperating interleaved constricting plates and the clincher plates are moved into engagement to close the legs of the closure members 11 about the constricted portions of the tube 44. Simultaneously with the clinching movement the knife 116 is advanced to sever the tube along line 12 and separate the end package 10 from the remainder of the tube 44 which continues its downward movement, the head 71 being operated to move downwardly with the movement of the tube 44.

In operating the machine the tube forming web material 20 is fed upwardly over the forming plate 30 and its direction of travel reversed while it is folded in encompassing relation about the filling mandrel 31 through which the material to be packaged is being forced by continuous operation of the pump 49. The electronic sealing electrodes 36 and 37 form a continuous longitudinal seam in the tube as it advances downwardly towards the laterally spaced pairs of feeding rollers 45 which engage the side marginal portions of the tube, collapse the same and advance the tube continuously. The feed rollers 45 feed the filled tube uniformly toward the tube constricting and closure applying cross head 71. The cross head 71 is timed to complete its cycle of operation within a predetermined period. The speed of the rollers 45 may be adjusted to vary the rate of movement of the tube and the volume of material delivered by the pump 49 may be adjusted so that the length of the package and the quantity of material in the same may be accurately controlled. The transversely reciprocating carrier blocks 80 and 81 within the cross head 71 which carry the tube constricting, closure applying, and tube severing elements are timed in their movement to first receive the closure members 11 from the reciprocating anvil 142 and thereafter to move toward each other to constrict the continuously advancing tube along a substantial area, to apply the pair of closure members 11 to the constricted tube in vertically spaced relation within the constricted area and to clinch the same while simultaneously severing the tube in the space between the closure members. Thereafter, the carrier blocks 80 and 81 move outwardly within the head 71 to release the filled tube and permit it to advance downwardly between the separated blocks. The cross head 71 is timed in its vertical reciprocatory movement so that its move downwardly with the tube while the closure applying and clinching operation is performed and thereafter moves upwardly free of the tube to repeat the cycle. It is not necessary that the downwardly advancing movement of the tube be adjusted to the same speed as the downward movement of the cross head 71. The tube and the head, of course, move at the same speed during the short period of time in which the closure members are applied and clinched around the constricted area of the tube. Due to the location of the cross head some distance below the end of the mandrel 31 there is clearance for some piling up of the tube as the constricting and closure applying operations are performed if the speed of advance of the tube is somewhat greater than the speed of movement of the cross head. The length of the package is controlled or varied by adjusting the speed with which the tube is advanced relative to the cross head. This is accomplished by the independent adjustment provided for the drive for the feed rollers 45. The amount of material within any given length of the tube is controlled or varied by adjusting the material feeding pump 49 to vary the amount of the material delivery to the advancing tube. These adjustments which can be made while the machine is in operation permit the size and contents of the packages to be held very closely to predetermined values, it being understood that the length and weight of the packages will be checked from time to time in order that any necessary adjustments can be made to enable the machine to produce a continuous stream of uniform packages of the desired size and content.

The knife 116 for severing between the individual packages 10 may be omitted where it is desired to retain the packages in connected relation. A chute member 214 (Fig. 1) may be provided beneath the head 71, if desired, to direct the severed packages to a container or other collecting means. When the knife 116 is omitted from the head 71 the packages may be separated, if desired, by a reciprocating knife mechanism arranged below the head 71.

Reciprocating movement of the head 71 is not necessary, particularly in packaging operations where the packages are relatively short and the closure may be formed rapidly. The posts 73 and the adjacent side frame members may be provided with holes 215 and 216 which may be aligned to receive locking bolts (not shown) to secure the head 81 in fixed position. The plate cams 78 may be released on the shaft 56 and slid inwardly out of engagement with the cam rollers 79 and 79'. The closure applying operation may then be timed so that there is only a relatively small piling up of the tube 44 between the head and the end of the filling mandrel.

Referring to Figs. 23 to 25 of the drawings, there is illustrated a mechanism which is adapted to be incorporated in the top portion of the machine and which is employed with certain types of web material to insure uniform and efficient formation of the longitudinal seam. When "Saran" film and certain other materials are used for the tube the stock rolls of the material are frequently affected by shrinking or swelling due to "plastic memory" or other causes to the extent that the edge or edges of a roll may result in the roll presenting a wrinkled or wavy appearance and consequent increase or decrease in the length of the material in the edge areas. It is desirable to have both edges of the web material substantially the same length in order to insure that a uniform longitudinal seal will be formed between the overlapped margins of the web when it passes through the longitudinal sealing mechanism. In the arrangement shown a roll of "Saran" or other web material having similar characteristics is indicated at 220 where it is supported on side brackets 221 extending rearwardly of the machine from the side frame members 222. The side frame members 222 constitute a portion of the top of the main frame or a sub-frame of the machine. A cross bar 223 is arranged at the top of the side frame members 222 and supports in adjustable relation thereon a pair of edge heaters 224 of generally rectangular shape which may be heated electrically or in any other conventional manner.

Each of the edge heaters 224 is connected by spacer type connectors 225 with the upper end of a vertical support plate 226, the latter being secured at its bottom end on the cross support bar 223 by means of U-shaped brackets or clamping members 227 which straddle the cross bar 223 and which are adapted to be secured in fixed relation thereon by locking screws 228. The plate 226 is secured to the ends of the legs of the bracket members 227 by conventional screws and the bracket members 227 may slide on the cross bar 223 when the set screws 228 are loosened.

Each of the edge heaters 224 is grooved or slotted on its inwardly facing edge at 229 (Fig. 25) to provide a recess for receiving a marginal edge of the web 220 as the latter is guided in a vertical direction over the guide roller 230 and between the heaters 224, the guide roller 230 being supported between the side frame members 222. The web 220 passes upwardly above the heaters 224 and over a guide roller 231 which is supported between brackets 232 extending rearwardly from the top cross frame member 233. From the roller 231 the web 220 passes beneath a guide roller 234 which is supported on plate-like side frame members 235 depending from the cross frame member 233. From the guide roller 234 the web passes upwardly and over the upper curved edge of a cylindrical folding plate 236 which is mounted in upstanding relation on a frame cross bar 237 extending between the side frame plates 235 and is curved to surround the hollow tube forming and filling mandrel 238, the latter being secured in depending relation on the cross bar 233 at the top of the machine. The upper edge 239 of the folding plate 236 is shaped or cut away to cause the web material 220 to reverse its direction and form into a tube 240 around the mandrel 238 in encompassing relation therewith.

The mandrel 238 is provided with a longitudinal seam forming heater or electronic sealing element 241 which cooperates with a movable sealing element 242 which is secured in forwardly extending relation on a depending arm 243. The arm 243 forms the stem of a T-shaped supporting bracket having its top or head members 244 secured at one end on a cross rod 245 which is journaled between the frame side plates 235, and having a counterweight 246 on the other end thereof. At one end the cross rod 245 is provided with a depending bracket plate 247. A latch arm or bar 248 is pivotally mounted at 249 on the lower end of the support plate 247 and provided at its upper end with an inverted L-shaped slot 250 which cooperates with a pin 251 on the frame member 232 to hold the electronic sealing element 242 out of engagement with the tube material when the bracket 243 is swung outwardly about the pivot 245 and the latch pin 251 is caused to engage in the upper end of the slot 250. The pin 251 may, of course, be disengaged by moving the latch arm 248 about its pivot 249.

The edge heaters 224 each being adjustable on the supporting cross bar 223, may be individually moved into or out of use as required by the condition of the web material so as to increase or decrease the length of the edge portions of the web sufficiently for the length to correspond on opposite sides of the web.

Referring to Figs. 26 to 28 there is illustrated a mechanism which is incorporated in the machine when the material being packaged includes chunks or other formations, having a greater degree of hardness than the remainder of the material, which tend to interfere with the operation of the closure applying head during the gathering and constricting of the tube. The illustrated mechanism is incorporated in the machine, as shown in Figs. 1 to 22, between the tube feeding mechanism as represented by rollers 45 and the tube constricting and closure applying cross frame or head 71.

In the form of the device illustrated a single pair of tube feeding rollers 260 is employed, which corresponds to the pairs of rollers 45, for engaging the filled tube 261 beyond the end 262 of the material feeding and forming mandrel and for advancing the tube continuously below the end 262 of the mandrel. The feed rollers 260 are mounted on shafts 263 which extend from a forwardly projecting plate-like bracket or support 264 which may be secured to an upstanding portion 264' of the main frame of the machine. The shafts 263 are provided adjacent the support 264 with interengaging pinions 265 which are driven by engagement with drive pinions 266 on the ends of drive shafts 267 which extend through the support bracket 264 to a side frame member of the machine (not shown). The shafts 267 are driven by a motor having a variable speed arrangement in the same manner as shafts 66 shown in Fig. 2. The feed rollers 260 engage the filled tube on opposite sides approximately on the longitudinal center line of the tube, collapse the tube and frictionally grip the walls between their peripheral surfaces to positively advance the filled tube as the rollers are rotated by their drive mechanism.

Between the supporting bracket plate 264 and the side frame of the machine the drive shafts 267 support a pair of L-shaped bracket arms 268 each of which is provided with a hub portion 269 forming a supporting sleeve on the shaft 267 and supporting the arm 268 in depending free swinging pivoted relation on the shaft 267. Each of the arms 268 carries at its lower end a shaft 270 on which there is arranged one of a pair of cooperating tube squeezing rollers 271, each of the latter having a peripheral surface of substantial width and extending across the tube 261 on opposite sides thereof. Each shaft 270 is connected by a train of gears 272, 273, 274 and 275 with a drive pinion 276 on the end of a motor drive shaft 277 which extends from the drive motor unit 278, the latter being supported on a bracket 279 which is attached to a part of the main frame of the machine. The motor unit 278 includes conventional speed control mechanism 280 so that the rotative speed of the squeezing rollers 271 may be adjusted to correspond approximately with the speed of advance of the filled tube.

The depending bracket arms 268 are provided adjacent their pivoted ends with laterally extending relatively short arms 281 and 282 which have their ends in overlapping relation with each other and connected by a pin 283 and slot 284 connection so that rotary movement of the one arm about its supporting pivot shaft 267 results in a corresponding rotary movement of the other arm in the opposite direction about its pivot shaft 267. One arm 268 is provided with a laterally extending operating arm 285 which is connected to the upper end of a pitman 286, the latter being reciprocated in proper timed relation to the advancing movement of the tube 261 by a suitable cam or eccentric connection with a rotating part of the main drive of the machine (not shown).

The crushing rollers 271 are positioned above the constricting and closure applying head or cross frame indicated in outline at 287 so that they do not interfere with the vertical reciprocating movement of the latter. They are timed in their operation so that they engage the filled tube and close on the same (Fig. 28) to flatten or squeeze away the material within the tube and remain in the closed position a sufficient length of time to provide a substantial cleared area 288 (Fig. 27) of approximately the same extent as the area in which the tube is constricted by the constricting head 287, the squeezing operation being timed to occur ahead of the constricting operation so that the constricting operation occurs when the crushed area 288 is advanced to position the same between the ends of the transversely reciprocating tube constricting members within the head 287. This mechanism crushes or moves out of the tube constricting area any chunks or other portions of the product which might otherwise interfere with effective constricting of the tube and application of the closure members and is particularly useful in the operation of the machine when the product being packaged is a relatively stiff fluid material with chunks of somewhat harder material interspersed therethrough such as, for example, a cookie dough of the chocolate chip type. It also operates to reduce the amount of the product within the area 288 in which the constriction of the tube occurs and thereby insures the proper functioning of the constricting members without damage to the tube walls.

Referring to Figs. 29 to 36 of the drawings, there is illustrated a modified form of a reciprocating cross frame or head having a mechanism incorporated therein which is operative to constrict the filled tube, to apply a pair of closure fasteners within the constricted area and to sever the tube within the constricted area between the closure fasteners.

The modified form of this mechanism comprises a generally rectangular outer supporting frame 300 having mounted therein, for reciprocation in a direction transversely of the machine and longitudinally of the frame 300, a pair of oppositely disposed slide block members 301 and 302 which are of rectangular shape and substantial thickness. The slide block members 301 and 302 are mounted for reciprocating movement in the frame 300 in an identical manner. Referring to block member 301 (Fig. 33) outwardly projecting slide formations or ribs 303 are provided on opposite side edges which are received in guideway forming grooves in recessed strip members 304 which are secured in fixed relation on the top edge of the side frame members by bolts or other conventional fastening members. The slide blocks 301 and 302 are provided with cam slots 305 and 306, respectively, which extend transversely of the frame 300. The cam slots 305 and 306 are adapted to receive cam rollers 307 which are carried on the outer ends of cam arms 308, the latter being mounted on the top ends of vertically extending operating shafts 309, which correspond to shafts 89 in Fig. 2 and which are connected at their bottom ends in driving relation with the main drive mechanism for the machine, in the same manner as illustrated in connection with shafts 89.

The slide block 301 has secured to its inner edge a plurality of relatively thin inwardly projecting tube constricting plate members which are of generally rectangular shape and which comprise top and bottom plates 311, 312 and four intermediate plates 313, 314, 315 and 316 which are arranged in spaced relation between the top and bottom plates 311 and 312. Each of the tube constricting plates is provided on its inner or free end with a generally V-shaped inwardly extending slot 317 which merges at the apex with a relatively short narrow rectangular pocket forming slot 318 having a semicircular terminus. The constricting plates are secured on the slide block 301 by means of laterally spaced bars 319 and 320 which have inwardly projecting slotted end portions for receiving the outer edge portions of the plates and which are in turn secured in a recess 321 in the inner edge of the slide block 301 by means of a pair of clamp plates 322, 323 the latter being fastened to the top face of the slide block 301 by means of conventional fasteners. The constricting plates 311, 312, 313, 314, 315 and 316 are held in superimposed, fixed relation on the supporting members 319 and 320 by means of a pair of removable, headed pins 324 which pass through cooperating aligned apertures provided in the plates and the supporting members. This arrangement provides for ready disassembly of the plates from the blocks 301 and the supporting members 319 and 320.

Figure 2:
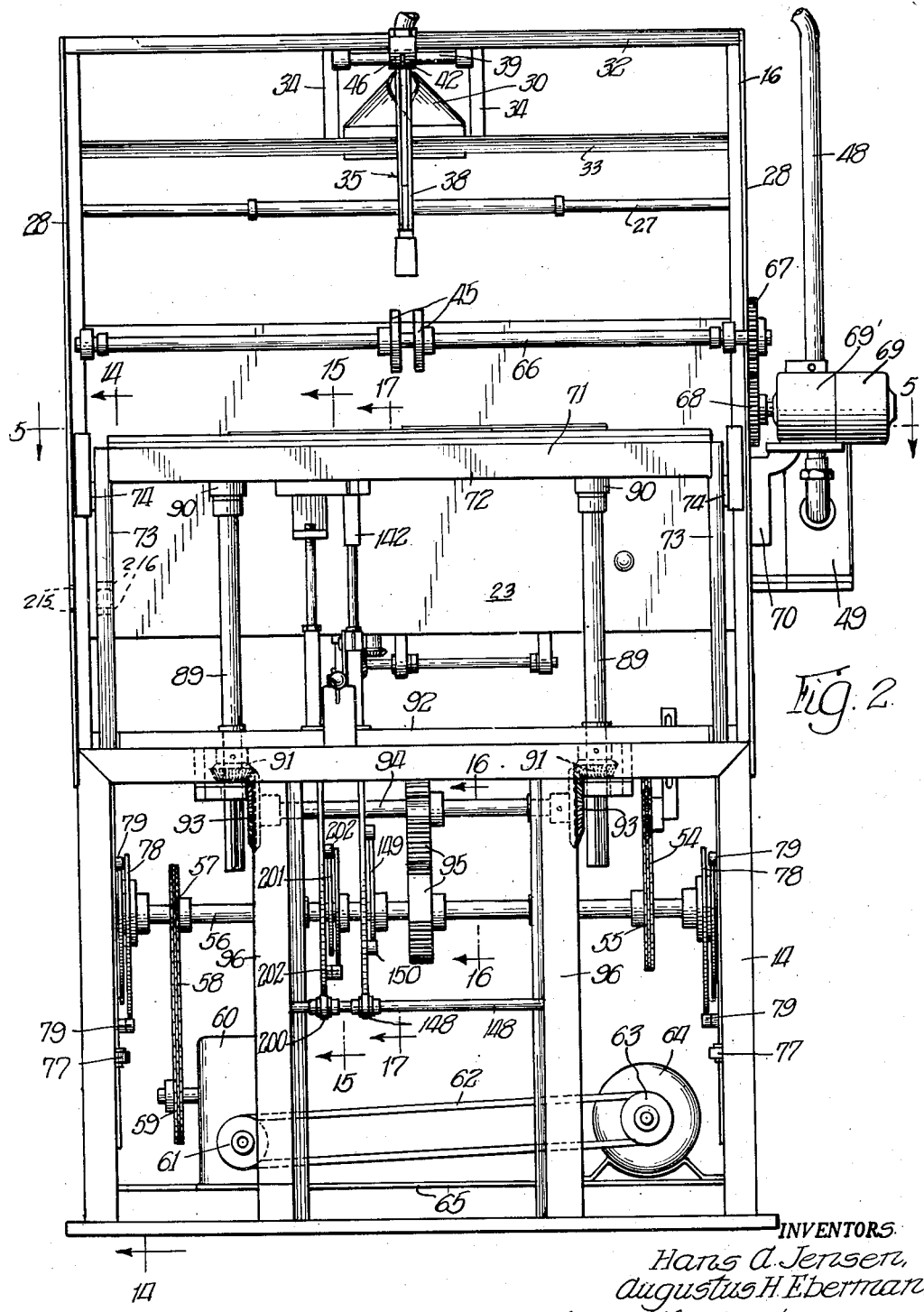
Fig. 2 is a front elevation of the machine.
Figure 41:
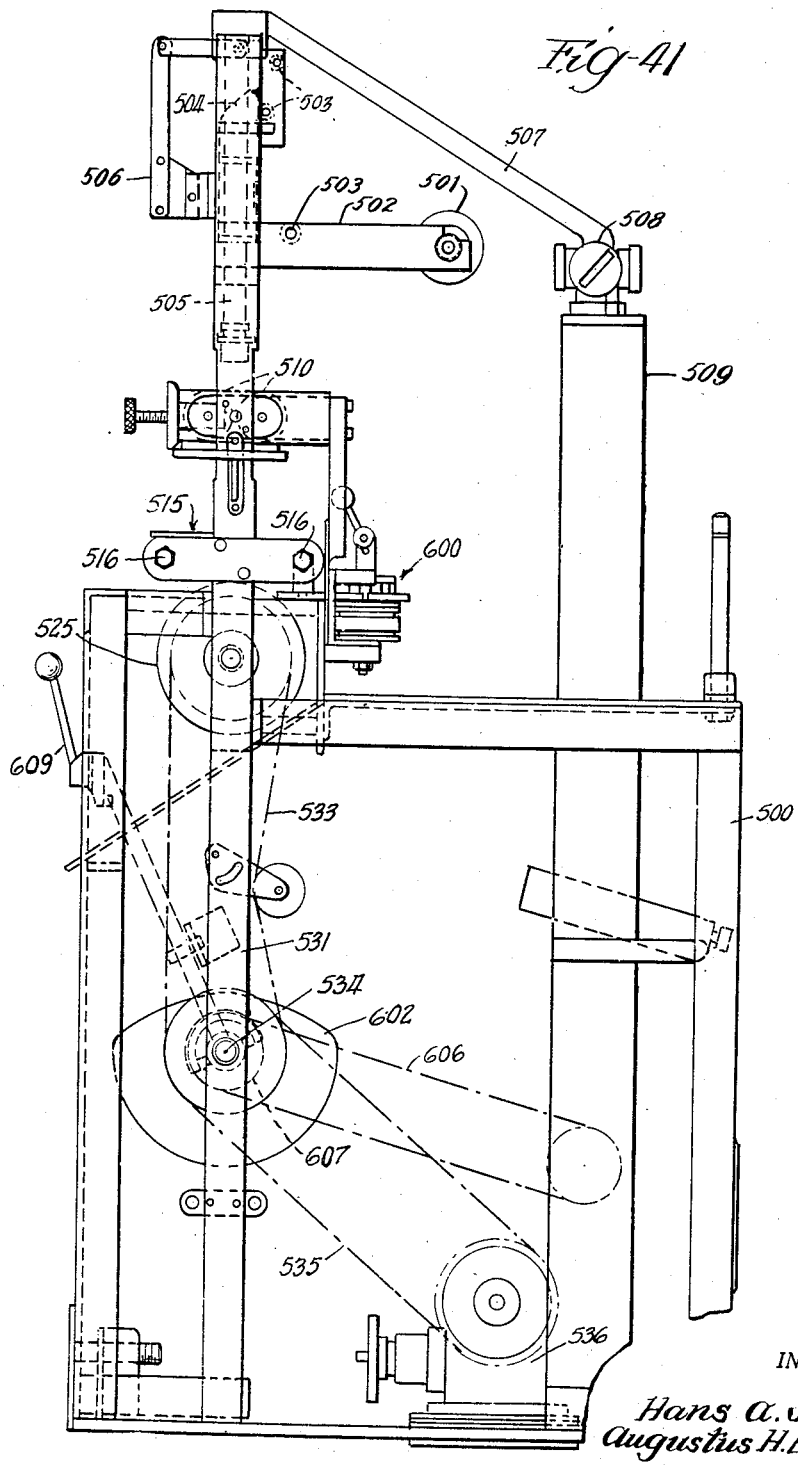
Fig. 41 is a side elevation of the machine in Fig. 40.

A closure clip holding and applying mechanism is arranged in sliding relation between the top plate 311 and the next adjacent plate 313 and between the bottom plate 312 and the next adjacent plate 316. Each clincher mechanism is identical and comprises a relatively narrow, generally rectangular center plate 325 (Fig. 31) which is secured by a removable pin 326 to a small slide block 327 which block 327 is slidably mounted in the recess 321 between the plate supporting members 319 and 320. The plate 325 is reduced in width at 328 and terminates in a closure clip engaging end edge 329, the latter having a concave surface. A pair of side plate members 330 and 331 are arranged on opposite sides of the center plate 325 which are secured to the small slide block 327 by means of projecting pins 332 and 333, the latter being received in suitable apertures in the ends of the plates 330 and 331. At their inner ends the plates 330 and 331 are formed with relatively narrow generally, rectangular inwardly offset end portions 334 and 335, which lie adjacent the narrow end portion 328 of the center plate 325 and extend inwardly beyond the end of the latter so that the opposed edges thereof and the curved end 329 of the center plate 325 define a pocket for receiving the closure forming metal clip 336 (Fig. 32) which is delivered thereto by the forming anvil 337, the latter corresponding to anvil member 142 (Fig. 2). Movement of the plate members 330 and 331 about pivot pins 332 and 333 is limited by stop pins 338 and 339 which project from the surface of the adjoining plate 313. The stop pins 338 and 339 permit a limited amount of movement of the end portions 334 and 335 away from each other to permit entry of the closure clip between the same. The end portions 334 and 335 are beveled at the outer corners at 340 and 341 for cooperation with a clincher mechanism carried on the opposite slide block 302 in a manner which will be explained.

The small slide block 327 which carries the closure clip clinching mechanism is slidable in the recess 321 in the slide block 301 between the fixed bars 319 and 320 and its movement is controlled by means of a top plate or cam member 342 of generally hexagonal shape which is secured to the slide block 327 by fastener screws 343 at its inner side and which is secured at its opposite outer side, by a screw 344, to a relatively small guide block 345, the latter being seated in a recess 346 in the outer edge of slide block 301 and being urged in the outer direction by a compression spring 347 which is positioned on the inner side of the recess 346 so that the clincher mechanism is normally held in the retracted position by the spring 347. The cam plate 342 is provided with a cam slot 348 which is arranged with its edge adapted to be engaged by the cam roller 307 at predetermined points in the travel of the latter. The small slide block 327 is held seated in the recess 321 in the side block 301 by the ends of plates 322 and 323 which extend over the opposite edges thereof. The rear guide block 345 is held in its guideway forming recess 346 by the bottom plate 349 which is attached thereto beneath slide block 301.

The slide block 302 (Figs. 29, 30, 34 and 35) at the opposite end of the frame 300 carries in inwardly extending relation thereon generally rectangular upper and lower clincher plates 350 which are arranged in vertically spaced relation on opposite sides of a central inwardly extending knife member 351. The clincher plates 350 are secured in recesses 352 at the inner edge of the slide block 302 by stud bolts 353 and extend inwardly within the frame 300 toward the slide block 301 at the other end thereof. Each clincher plate 350 is provided at its inner edge with a generally rectangular slot or recess 354 which extends inwardly of the edge of the plate and which is adapted to receive the end portions 334 and 335 of the clincher plate members 330 and 331 which are carried by the opposite slide block 301. The outer corner edges of the recess 354 are beveled or rounded at 355 to engage with the beveled outer edges 340 and 341 of the clincher members 330 and 331 and force the end portions 334 and 335 of the latter towards each other during the clinching operation. At the inner edge of the recess 354 there is a recess 356 which extends further inwardly of the plate edge and which is of generally T-shaped formation. The T-shaped inner recess 336 is adapted to receive a T-shaped clincher insert 357 of relatively hard metal which has a concave inner edge 358 providing a concave clinching surface for engagement with the free ends of the legs of the clips 336 which are held between the end portions 334 and 335 of the clincher plate members 330 and 331 during the clip applying operation. The knife member 351 which is located in vertically spaced relation between the rectangular clincher plates 350 is in the form of a rectangular plate with a diagonal cutting edge at its inner end and is connected at the opposite end to the clincher plates 350 by the removable pin 359 which passes through vertically aligned apertures therein.

Upper and lower tube constricting plates 360 are arranged on opposite sides of the knife 351 with their outer, or upper and lower faces, respectively, in spaced relation with the adjacent inner faces of the clincher plates 350. The clincher plates 350, the knife 351 and the constricting plates 360 are all received within one end of a guideway forming housing 361 which is detachably connected with the slide block 302. The housing 361 comprises side members 362 which are connected by top and bottom constricting plates 363 and 364, the latter being rigidly secured at opposite side margins to the top and bottom faces thereof and cooperating to form a hollow casing of less width than the inside dimension of the cross frame 300. The side members 362 of the housing 361 are provided at one end (Fig. 36) with vertically spaced guideways forming longitudinal slots 365 for receiving the side edges of clincher plates 350 and constricting plates 360 while at the other end they are provided with vertically spaced guideway forming slots 366 for receiving the marginal edges of the constricting plates 311, 312, 313, 314, 315 and 316 which are secured to and extend inwardly of the inner edge of the slide block 301.

The housing 361 is secured to an L-shaped slide member which has a block-like base portion 368 mounted for sliding movement in a rectangular recess 369 in the slide block 302. The recess 369 opens on the upper face of the slide block 302 and extends inwardly of the inner edge thereof a greater distance than the recess 352 so that there is sufficient clearance for limited sliding movement of the slide member 368 relative to the slide block 302. The housing 361 is secured to the relatively thin plate-like stem or leg portion 370 of the L-shaped slide member which extends in the direction of the block 301 and along the lower face of the knife 351 with an upwardly opening guideway forming recess 371 therein for the knife 351. The housing 361 is connected to the leg 370 of the L-shaped slide member by removable pins 372 which are engaged in suitable aligned apertures provided in the plate members 360, 363 and 364 and in the leg 370 of the slide member. The leg 370 of the slide member is slotted at 373 to accommodate the pin 359 and permit the same to slide relative to the slide block 302, the clincher plates 350 and knife 351. The clincher plates 350 are slotted at 374 to accommodate the pins 372 and permit relative movement between the housing 361 and the clincher plate and knife assembly. The tube constricting plates 360, 363 and 364 are each provided on the edges which are in facing relation with the slide block 301 with an inwardly extending V-shaped slot 375 having the apex thereof in the form of a semicircle. The constricting plates 360, 363 and 364 are arranged with the grooved edges aligned for cooperation with the grooved constricting plates which are carried on the slide block 301 and which interleave with the same when the slide blocks 301 and 302 move toward each other for the tube constricting operation. Filler plates 376 are riveted or otherwise secured on the faces of the constricting plates 360, 363 and 364 which are of generally triangular shape with a portion at the apex having the shape of the pocket forming recesses 318 in the constricting plates on the slide block 301 and with a concave end edge in alignment with the apex portion of the slots 375. The end portions of the filler plates prevent the tube material from bulging in the spaces between the constricting plates and also help to hold the legs of the closure clips 336 in alignment as they are clinched on the constricted tube.

The slide member 368 is controlled in its movement relative to the slide block 302 by a rectangular plate 377 which is mounted for sliding movement on the top of the block 302 and which is secured to the top face of slide member 368 by bolts 378. The plate 377 is provided with a cam slot 379 which receives the cam roller 307 and which is shaped to provide for the desired movement of the tube constricting, closure clinching and knife members carried by the slide blocks 302 and the slide member 368. At its rear edge the cam plate 377 is guided relative to the slide block 302 by an upstanding guide pin 380 and a guide slot 381 in the plate which cooperates with the guide pin.

In operating the slide blocks 301 and 302 to accomplish the tube constricting and closure applying movements the cam roller 307 is first operated to move the slide block 301 inwardly a sufficient distance to receive the closure clips 336 from the reciprocating anvil 337. The anvil 337 is then retracted and cam rollers 307 are operated to move the slide blocks 301 and 302 towards each other until the tube is fully constricted in the V-shaped slots between the ends of the constricting plates on the respective slide mechanisms. As the constricting operation is completed the ends of the leg portions of the closure clips 336 are engaged by the curved ends of the clincher elements and forced around the constricted area in the tube. The severing knife 351 is moved inwardly with the clincher plates 350 and the tube is severed between the closure clips 336 as they are applied. As the slide blocks 301 and 302 begin their return movement the cam roller 307 engages the high point in the cam edge of the plate 342 and the closure applying and clinching plate 325 is moved inwardly relative to the remainder of the mechanism a sufficient distance, against the action of the spring 347, to function as an ejector for ejecting the closure members from the pockets in which they are seated during the clinching operation.

Referring to Figs. 37 to 39 of the drawing, there is illustrated a modified form of Geneva drive mechanism which is adapted to be employed in the machine, in place of the segmented drive gears 95 (Fig. 2) for driving the mechanism for reciprocating the slide blocks in the tube constricting and closing head 72. The female portion of the Geneva drive which includes the circular plate 400 and its associated mechanism is adapted to be secured on the driven shaft 94 (Fig. 2). The male portion of the Geneva drive which includes the triangular plate 401 and its associated mechanism, is adapted to be secured on the power drive shaft 56 (Fig. 2), the latter being constantly rotated by the main drive for the machine.

The female plate member 400 which is keyed to the shaft 94 is provided with four outwardly opening radially extending cam receiving slots 402, 403, 404 and 405 which are angularly spaced to provide approximately 97.5° between slots 402, 403 and 404, 405 and aproximately 82.5° between slots 403, 404 and 405, 402. The slots in the female plate 400 are adapted to receive cam rollers 406 and 407 which are mounted on the triangular plate 401, the latter forming the main portion of the male drive mechanism and being keyed on the drive shaft 56. The triangular plate 401 is mounted on the shaft 56 adjacent one apex while the cam roller 406 is secured on the triangular plate 401 adjacent one of the other two apexes of the same. The other cam roller 407 is mounted on an eccentric 408 which is journaled in the plate 401 at the opposite outer apex and which rotates about a small shaft 409. The shaft 409 has mounted on its other end a pinion 410 which engages with a fixed gear 411. The gear 411 is rotatably mounted on the shaft 56 and secured against rotative movement therewith by attaching the same to a cross bar 412 on an upstanding support bracket 413 which is in turn secured in fixed relation on the main frame of the machine. The ratio of the gear 411 to the pinion 410 is 4 to 1. The arrangement provides for rotation of the cam roller 407 by means of the eccentric 408 about the pivot 409 as the plate member 401 revolves on the axis of the drive shaft 56 and thus changes the distance between the center of rotation of the plate 401 and the center of the cam 407 while the latter moves into and out of operative engagement with the odd numbered slots 403 and 405 in the female plate 400. The effect of the eccentric mounting of the cam roller 407 is to speed up the movement of the Geneva plate 400 at the beginning and end of each cycle and to slow down the movement of the plate 400 during the middle or high speed part of the cycle, thus obtaining a more uniform speed of movement of the blocks 80 and 81 during the return or separating movement in their cycle of reciprocation.

The female plate member 400 has associated therewith a supporting plate 415 which is secured on the shaft 94 in fixed relation to the plate 400 and which carries cam rollers 416, 417, 418 and 419 arranged in paired relation and in alignment with the slots 402, 403, 404 and 405. The pairs of cam rollers 416, 418 and 417, 419 are spaced at different distances from the center of rotation of the shaft 94 as shown in Fig. 38. These cam rollers cooperate with a double plate cam on the shaft 56 which consists of cam plates 420 and 421. The cam plates 420 and 421 rotate with the shaft 56 and modify the movement of the shaft 94 in response to the operation of the drive mechanism 401. The rollers 416 and 418 are engaged with the cam edge or track of plate 420 while the other pair of rollers 417 and 419 are engaged with the cam edge of the plate 421. The cam edges of the plates 420 and 421 are so arranged that they provide first a dwell or lock preventing movement of shaft 94, as cam roller 407 leaves slot 403 or 405, then they provide a small 15 degree movement of shaft 94 causing the heads 80 and 81 to move inwardly toward each other and bringing the head 80 into position to receive the closure members from the carrying anvil which delivers them to the head. This same movement also brings slot 402 or 404 into position to receive roller 406. Thereafter the cam edges again provide a dwell or lock, preventing movement of shaft 94 until roller 406 enters slot 402 or 404. The cam plates 420 and 421 and their cooperating cam rollers on the plate 415 rotate the shaft 94 and provide for the small initial inward movement of the slide block 80. The shaft 94 is thereafter rotated by engagement of the cam roller 406 in the slot 404 or 402.

The modified Geneva construction which is illustrated provides for an initial short inward movement of the slide block 80 sufficient to pick up the closure fasteners from the forming and delivering mandrel for completion of the inward movement to the closure forming and applying position, and for the return or outward movement of the slide block.

Referring to Figs. 40 to 44 of the drawings, there is illustrated a modified form of the machine which is particularly adapted for producing packages which are of relatively small length and which can be formed in a very rapid manner. The machine is so constructed that the tube is applied to a hollow filling mandrel and advanced continuously while it is filled with the material to be packaged, the filled tube is constricted at longitudinally spaced intervals, a pair of spaced closure clips are applied in the constricted area and the tube is severed between the clips. All the operations are carried out in the same manner as in the mechanisms heretofore described except that the tube constricting, closing and severing mechanism is mounted in fixed relation on the machine and does not reciprocate in the direction of the axial movement of the filled tube.

The mechanism illustrated comprises an upstanding, generally rectangular main frame 500 of the same general character as the main frame of the machine shown in Figs. 1 to 22. Other structure in the modified form of the machine is identical with or similar to the structure shown in the machine previously disclosed except as hereinafter described. A roll or web of tube forming film material 501 is supported on rearwardly extending brackets 502 at the upper end of the machine which is guided by rollers 503 up and over the top edge of a forming plate 504. The web material is formed into a tube around a hollow tubular mandrel 505 and sealed by a sealing mechanism indicated at 506, the mandrel and sealing mechanism being identical with the corresponding mechanism of the previously described form of the machine. The material being packaged is supplied to mandrel 505 through a conduit 507 which is connected with an adjustable pump mechanism 508 supported on an upstanding support frame 509 at the rear of the machine. The filled tube is fed below the mandrel 505 by pairs of spaced feed rollers 510 which are mounted on shafts 511 journaled in supporting frame members and driven by a motor unit 512 through interengaging gears 513 and 514 on the motor unit and the shafts 511, respectively. The motor unit 512 includes mechanism for varying the speed of the same. The filled tube is delivered by the feed rollers 510 to a transversely extending tube constricting, closure applying and severing mechanism 515.

The tube constricting and closing mechanism is mounted on a pair of fixed guideway forming cross rods 516 which extend crosswise of the main frame in laterally spaced relation below the tube advancing rollers 510. The guide rods 516 carry in sliding relation thereon a pair of oppositely disposed slide blocks 517 and 518 which are of generally H-shaped form with aligned apertures 519 extending in paired relation through the top and bottom portions of the side arms and with the cross arm forming the body of the block. The cross rods or bars 516 are received in the apertures 519 of the blocks 517 and 518 and serve as guides or ways for supporting the slide blocks for transverse reciprocation beneath the mandrel 505 of the machine.

The slide blocks 517 and 518 are reciprocated toward and from each other on the supporting cross rods 516 by means of cam rollers 520 and 521 which depend from the outer ends of the bottom faces thereof and engage in cam slots 522 and 523 in the peripheral surfaces of barrel cams 524 and 525, respectively. The barrel cams 524 and 525 are journaled on shafts 526 and 527 which are fixed in spaced upstanding side frame members 528, 529 and 530, 531. The cams 524 and 525 are connected by chain drives 532 and 533 with the ends of a main drive shaft 534. The shaft 534 is connected by a chain drive 535 with a change speed mechanism 536, the latter in turn being driven by a belt or chain connection 537 with the drive shaft of a motor unit 538 at the base of the machine.

The reciprocating slide blocks 517 and 518 (Figs. 42 to 45) are provided with tube constricting, closure clip applying and tube severing elements which are very similar to those shown on the slide blocks 301 and 302 (Figs. 29 to 36). Slide block 517 carries on its inwardly facing edge a plurality of vertically spaced generally rectangular tube constricting plate members comprising top and bottom members 540, 541 and intermediate plates 542, 543, 544 and 545, which are held in superimposed relation by removable bolts 546 and a bottom cross bar 547, the plates being provided on their inner edges with inwardly opening V-shaped slots 548, the latter terminating at the apex in a pocket forming recess 549. The intermediate plates 542 to 545 are separated from each other by generally triangular spacer plates 550. The top and bottom tube constricting plates 540 and 541, which are identical, are provided at their outer ends with extended portions which are positioned on the top and bottom faces of the slide block 517. Each of these plates has associated with it a backing plate 551 which is generally V-shaped at its inner end and which is secured to the exposed face of the constricting plate assembly by the bolts 546, and to the slide block 517 by removable pins 552 which extend through suitable apertures in plates 540, 541. At their rear ends the top and bottom plates 540, 541 and their associated plates 551 are provided with transversely spaced slots 553 which engage headed guide members 554. Both sets of these plates are also slotted at 556 and 557 on their longitudinal center line to clear certain movable members which form part of the closure applying mechanism.

A closure clip holding and clinching mechanism is provided between the top and bottom plates 540, 541 and the next adjacent intermediate plates 542 and 545, respectively, which closure applying mechanism is substantially the same as the corresponding mechanism in the forms of the tube constricting head theretofore described. Each closure applying mechanism includes an elongate rectangular center plate 558 having an inner clip engaging end 559 of reduced width, and being positioned at its outer end within a guideway forming recess 560 in the face of the block 517. Each center plate 558 extends inwardly between elongate side plates 561 each of which has at its inner end an offset portion 562 of reduced width, the latter being positioned to define with the end portion 559 of the center plate 558 a pocket for receiving the U-shaped metal closure forming members and having the outer corner beveled at 563 for cooperation with the clincher devices on the opposite slide block 518. The side plates 560 are pivoted at their outer ends on pins 564 which project vertically into recesses 565 in the slide block 517 in which the ends of the plates 561 are seated. Outward swinging movement of the side plates 561 is limited by generally rectangular filler plates 566 which are secured at the outer sides thereof. The center plates 558 extend at their outer ends within the inner portions of guideway forming recesses 560 and are connected for simultaneous sliding movement in the guideways 560 by a small slide block 567 secured thereto by a bolt 568 and seated for sliding movement in a guideway forming recess 569 in the slide block 517. A compression spring 570, seated at one end in a shallow recess in the small block 567 and at the other end on a pin 571 extending from the forward wall of the recess 569, urges the slide block 567 outwardly relative to the slide block 517 to normally retract the center plates 558. A pair of slide plates 572 are provided in the outer ends of the guideways 566 which are connected by a bolt 573 having a cam roller 574 mounted on the lower end which is adapted to be moved inwardly of the slide block 517 by cam plate 575 on the rotating cam member 524 (Fig. 40) to cause the plates 572 and 558 to move inwardly and eject the closed fastener members after the clinching operation.

The opposite slide block 518 carries at its inner edge generally rectangular top and bottom clincher plates 580, each having an outer end portion 581 of reduced width which is secured in a recess 582 in an edge portion of the slide block 518 by bolts 583. The inner edges of the clincher plates 580 are recessed at 584 to receive the end portions 562 of the clincher plate members 561 on the slide block 517 and also provided with a connecting T-shaped recess 585 in which there is seated a clincher element 586 of like shape. The clincher plates 580 are spaced so that they align with the spaces between the plates 540, 542 and 541, 545 on the slide block 517 and a knife 587 is mounted between the clincher plates 580 in alignment with the space between the plates 543 and 544. A headed pin 588 secures the knife in fixed relation to the clincher plates 580. The clincher plates 580 are received in a housing 589 which is identical with the housing 360 (Fig. 29) and which includes constricting plates and spacer plates which interleave with the clincher plates 580 and the constricting plates on the slide block 517. The housing 589 is connected to the clincher plates 580 by removable pins 590 which extend through slots 591 in the latter. The housing 589 is urged inwardly of the slide block 518 by compression springs 592 which are seated in recesses 593 in the slide block 518 and are secured at the inner end to stop washers 594 on guide pins 595 extending from the housing 589 into the recesses 593. The guide pins 595 each extend at the outer end into a conventional dashpot arrangement indicated 596 which is automatically refillable with oil from the supply cup 597 and which reduces the pounding effect caused by the operation of the springs 593 when the housing 589 moves away from the opposite slide block 517 at the beginning of the opening cycle of the slide blocks. The slide blocks 517, 518 and their associated mechanism operate on the filled tube in the same manner as described in connection with the mechanism shown in Figs. 29 to 36.

Closure forming clip members are formed by the clip forming mechanism indicated at 600 (Figs. 40 and 41) which may be identical with the clip forming mechanism of Figs. 1 to 22 and which includes the anvil member 601, the latter being mounted between the frame members 529, 530 and being vertically reciprocated by cam 602 on the cam shaft 534. The strip feed for the clip forming mechanism 600 may be intermittently operated by a link 603 having a pin and slot connection 604, 605 with the slide block 517. The material feed pump 508 may be driven by a suitable chain drive connection 606 with the sprocket 607 on the cam shaft 534 and controlled by a clutch mechanism 608 with manual control members indicated at 609.

Operation of the machine shown in Figs. 40 to 45 is substantially the same as in the form of the machine previously described. The web material 501 is formed into a continuous tube around the hollow mandrel 505 and fed downwardly by the feed rollers 510 to the constricting and closure applying mechanism 515 while the product to be packaged is fed through the mandrel and into the tube by operation of the pump 508. The reciprocating slide blocks 517 and 518 are operated by the cam members 524, 525 at regular intervals while the filled tube is moving downwardly to constrict the tube, apply the U-shaped closure elements and sever the tube between the closures. The slide blocks 517 and 518 are reciprocated at a relatively rapid rate and the movement of the tube is halted only momentarily while the closure elements are applied. The mechanism is particularly applicable to the production of relatively short packages when the piling up of the filled tube during the closure applying operation is relatively small and is accommodated within the space provided between the feed rollers 510 and the fixed cross frame in which the slide blocks 517 and 518 are supported.

We claim:

1. In a machine for continuously forming a series of packages, a hollow forming mandrel, mechanism for folding a continuous web of material around said mandrel with the longitudinal edges thereof in contiguous relation, mechanism for joining said edges to form a continuous longitudinal seam, mechanism for continuously feeding a product through said hollow mandrel, mechanism reciprocable in the direction of axial movement of said material for constricting the same at predetermined longitudinally spaced intervals, mechanism operable independently of said constricting mechanism for pre-forming a pair of generally U-shaped individual closure elements, and for delivering said pre-formed closure elements from said preforming mechanism to said constricting mechanism, and said constricting mechanism including mechanism for positioning said closure elements around the constricted area of said material and for clinching the same to form the top of one package and the bottom of the next succeeding package.

2. In a machine for continuously forming a series of packages, a hollow mandrel, mechanism for forming a web of material into a tube around said mandrel, mechanism for forming a longitudinal seam in said tube, cooperating continuously driven feed rollers for continuously advancing said formed tube, mechanism operable on opposite sides of said tube for circumferentially constricting the same at predetermined longitudinally spaced intervals, mechanism operable independently of said constricting mechanism for pre-forming successive pairs of generally U-shaped bendable closures, and for delivering said closures simultaneously to said tube constricting mechanism, said tube constricting mechanism including cooperating clincher mechanisms for positioning said closures around the constricted area of said tube and for clinching the same to simultaneously close the top of one package and the bottom of the next succeeding package, and mechanism for delivering the material to be packaged to the tube as it leaves the mandrel and is engaged by the constricting and closure applying mechanisms.

3. In a machine for continuously forming a series of packages, a hollow mandrel, mechanism for forming a web of material into a tube around said mandrel and sealing the contiguous longitudinal edges, cooperating pairs of continuously driven feed rollers for continuously advancing said formed tube, mechanism operable on opposite sides of said tube for moving into engagement with said tube and circumferentially constricting the same at predetermined longitudinally spaced areas, mechanism for pre-forming and separating from relatively stiff bendable material successive pairs of generally U-shaped individual closures, said closure pre-forming mechanism being operable to deliver said closures to said tube constricting mechanism, said tube constricting mechanism having spring pressed clincher mechanisms for positioning said closures around the constricted areas of said tube and for clinching the same to close the top and bottom of succeeding packages, and mechanism for delivering charges of the material to be packaged to the tube through the mandrel.

4. In a machine as recited in claim 3, wherein mechanism is provided for intermittently moving said tube constricting mechanism in the direction of axial movement of said tube while the same is engaged with said tube.

5. In a machine as recited in claim 3 wherein said mechanism for pre-forming said closures comprises cooperating anvil and forming members and means for moving said anvil member to deliver the closures to said tube constricting mechanism.

6. In a package forming mechanism having a supporting frame, a hollow mandrel fixed on said supporting frame, means associated with said mandrel for continuously folding a web around the same, means for forming a longitudinal seam in the folded web to provide a continuous tube formation, means for advancing the tube formation in the direction of the axis of the mandrel, and means for feeding material to be packaged through the mandrel in a continuous stream, the provision of means for constricting the tube formation at predetermined areas which comprises a generally rectangular hollow box-like frame arranged to extend across the path of axial movement of said tube formation, a pair of cooperating oppositely disposed heads mounted for reciprocable movement in said frame on opposite sides of said tube formation, and a plurality of plates mounted in spaced relation on each of said heads, said plates each having generally V-shaped ends and being arranged on said heads with the V-shaped ends extending inwardly of the heads toward said tube formation in edge opposed relation whereby said plates will move into interleaved relation when said heads are moved toward each other to constrict said tube formation throughout a substantial area longitudinally of the tube formation.

7. In a machine for continuously forming a series of packages which machine is provided with a hollow mandrel, mechanism for supplying a continuous tube of relatively thin pliable material around said mandrel and mechanism for continuously advancing said tube, a frame reciprocably mounted for movement in the direction of axial movement of said tube, said frame having opposed groups of spaced slotted plate members movable toward and from the tube for constricting the same at predetermined longitudinally spaced areas, mechanism for delivering successive pairs of generally U-shaped individual closures to said constricting plate members, mechanism arranged adjacent the outermost plate members of each of said groups of plate members for positioning each successive pair of said closures around a constricted area of said tube and for clinching the same to close the top of one package and the bottom of the next succeeding package, and mechanism for delivering the material to be packaged to the tube through the mandrel.

8. In a machine for continuously forming a series of packages, a frame support, a hollow forming mandrel fixed on said frame support, mechanism for folding a continuous web of material around said mandrel with the longitudinal edges thereof in contiguous relation, mechanism for joining said edges to form a continuous tube and mechanism for feeding a product through said hollow mandrel in a continuous stream, a reciprocable frame movable in the direction of axial movement of said tube, a pair of oppositely disposed heads movable on said frame, said heads being in the same plane and movable transversely of the axial movement of said tube, each of said heads comprising a plurality of spaced plate members having V-shaped slots in the opposed edges thereof, said plates moving into interleaved relation upon movement of said heads toward each other for constricting the tube at predetermined areas spaced longitudinally of said tube, mechanism for pre-forming a pair of generally U-shaped closures, and for delivering said closures simultaneously to one of said heads, said last mentioned head having pockets for receiving said closures and mechanism between the plates of the other one of said heads for clinching said closures around a constricted area of said tube to close the top of one package and the bottom of the next succeeding package.

9. In a machine for continuously forming a series of packages, in which a hollow mandrel is provided through which the material to be packaged is adapted to be moved, and in which mechanism is provided for applying a tube around said mandrel, and for advancing the tube along the mandrel to a position beyond the end of the same for receiving the material to be packaged; the provision of a frame reciprocably mounted for movement in the direction of axial movement of said tube, said frame having spaced slotted plate members movable toward and from the tube in a direction transversely of the axis of the tube for constricting the same at predetermined longitudinally spaced areas, mechanism for delivering successive pairs of generally U-shaped closures to said constricting plate members, mechanism movable with said plate members for positioning each successive pair of said closures around a constricted area of said tube, mechanism for clinching the same to close the top of one package and the bottom of the next succeeeding package and mechanism for delivering in a continuous stream the material to be packaged to the tube through the mandrel.

10. In a machine for continuously forming a series of packages, a hollow tubular mandrel, mechanism for applying a continuous tube around said mandrel, mechanism for continuously advancing said tube beyond said mandrel, mechanism mounted for reciprocation in the direction of axial movement of said tube for constricting the tube at predetermined longitudinally spaced intervals and for applying to the constricted portions of the tube successive pairs of metal closure elements, mechanism for forming from continuous strips of metal pairs of generally U-shaped closure elements and separating the same therefrom, said forming mechanism being operable to deliver said closure elements to said tube constricting and closure applying mechanism, said tube constricting and closure applying mechanism having means for moving said closure elements into position on the constricted portion of said tube and for clinching the same to close the top of one package and the bottom of the next succeeding package.

11. In a machine for continuously forming a series of packages, said machine having a hollow forming and filling mandrel, mechanism for applying a tube around said mandrel, and mechanism for continuously advancing said tube, a frame mounted for reciprocation in the direction of axial movement of said tube, said frame having spaced constricting members mounted therein for movement toward and from the tube to constrict the tube at predetermined longitudinally spaced intervals, mechanism independent of said frame for forming successive pairs of generally U-shaped closures, and for delivering said closures to one of said movable constricting members, said constricting members including means for positioning each successive pair of said closures around a constricted area of said tube and for clinching the same to close the top of one package and the bottom of the next succeeding package, and means for delivering the material to be packaged to the tube as it leaves the mandrel and is engaged by the constricting and closure applying mechanism.

12. In a machine for continuously forming a series of packages, which machine is characterized by a hollow forming mandrel and mechanism for applying a continuous tube about the mandrel and advancing the tube beyond the end of the mandrel, a tube dividing and closure applying mechanism adjacent the end of the mandrel, said dividing and closure applying mechanism comprising a frame mounted for reciprocation in the direction of movement of the advancing tube, constricting heads mounted in said frame for movement toward and from said tube to engage the tube at axially spaced points and constrict a substantial section thereof at each engagement, mechanism for forming and separating from a pair of metal strips generally U-shaped closure elements, said closure forming mechanism comprising a movable anvil, cooperating movable forming members for shaping the closure elements around the anvil, and means to move said anvil into and out of the path of movement of one of said constricting heads, whereby to deliver successive pairs of closure elements to said head, said head having mechanism for receiving said closure elements from said anvil and for thereafter moving said closure elements into position about constricted portions of said tube and said heads having means for clinching said closure elements to form spaced closures thereon.

13. In a machine for continuously forming a series of packages, which machine is characterized by a hollow forming mandrel and mechanism for applying a continuous tube about the mandrel and for advancing the tube continuously beyond the end of the mandrel, a tube dividing and closure applying mechanism adjacent the end of the mandrel comprising a frame mounted for reciprocation in the direction of movement of the advancing tube, constricting members mounted for reciprocation in said frame and adapted to engage the tube at axially spaced points and constrict a substantial section thereof at each engagement, mechanism for forming from a pair of strips of relatively stiff material generally U-shaped closure elements, said closure forming mechanism comprising a movable anvil member, cooperating movable members for forming the closure elements on the face of the anvil member, means for moving said anvil member into and out of the path of movement of one of said constricting members whereby to position successive pairs of closure elements between said constricting members and said tube, said constricting members having recesses for receiving said closure elements and removing the same from said anvil member and having clinching members for securing said closure elements in position about constricted portions of said tube by closing the same around the tube.

14. In a machine for forming a plurality of packages, a generally rectangular upright supporting frame, mechanism at the upper end of said supporting frame for supplying a tube of relatively thin pliable material and for feeding the tube downwardly, a U-shaped frame mounted for vertical reciprocation in said supporting frame below said tube supplying mechanism, the horizontal portion of said U-shaped frame being of hollow box-like construction and having arranged therein mechanism for gathering, sealing and severing the tube, the vertical side portions of said U-shaped frame extending along the sides of said supporting frame and being supported therefrom by side guides, said supporting frame including a fixed cross support beneath the horizontal portion of said U-shaped frame, drive means mounted at the lower end of said supporting frame, said drive means being connected to said vertical side portions of said U-shaped frame for reciprocating the same, and driving connections between the drive means and the mechanism for gathering, sealing and severing the tube, said driving connections including a rotatable shaft extending downwardly from the horizontal portion of said U-shaped frame through said cross support and in splined engagement with a driving gear mounted on said fixed cross support.

15. In a machine for forming from a continuous web a plurality of packages, a generally rectangular upright supporting frame, mechanism at the upper end of said supporting frame for forming said web into a tube and for feeding the tube downwardly, an inverted U-shaped frame mounted for vertical reciprocation in said supporting frame below said tube forming mechanism, the horizontal portion of said U-shaped frame being of hollow boxlike construction and having mounted for reciprocation therein mechanism for gathering, sealing and severing the tube, the vertical side portions of said U-shaped frame extending downwardly along the sides of said supporting frame and being supported in side guides thereon, said supporting frame including a fixed cross support beneath the horizontal portion of said U-shaped frame, drive means mounted in fixed relation below said cross support, said drive means being connected to said vertical side portions of said U-shaped frame for reciprocating the same, and driving connections between the drive means and the horizontal portion of said U-shaped frame for reciprocating the mechanism for gathering, sealing and severing the tube, said driving connections including a vertically extending shaft journaled at the upper end in the horizontal portion of said U-shaped frame and extending in splined engagement through a driving gear mounted on said cross support.

16. In a machine for forming a tube from a web of material and continuously advancing the same, a hollow tubular mandrel, a forming plate mounted at the upper end of said mandrel, said forming plate having an upper portion over which the web is advanced and having lower portions extending around the mandrel to bring the edges of the web into overlapping seam forming relation, an electronic sealing mechanism arranged adjacent said mandrel below said forming plate, said sealing mechanism comprising an elongate sealing element mounted on a pivoted arm and a counterweight adjustably mounted on said arm to hold said sealing element in engagement with the overlapped edges of said web, and mechanism below the lower end of said mandrel engaging the formed tube along collapsed portions thereof for advancing the formed tube in the direction axially of said mandrel.

17. In a machine for forming a tube from a web of material and continuously advancing the same, a hollow tubular mandrel, a perforated forming plate mounted at the upper end of said mandrel, said forming plate having an upper portion over which the web is advanced and having lower portions extending around the mandrel to bring the edges of the web into superimposed seam forming relation, heat sealing mechanism arranged adjacent said mandrel below said forming plate, said sealing mechanism comprising an elongate pivotally mounted sealing member and a counterweight operable on said sealing member to hold said sealing member in engagement with the overlapped edges of said web, cooperating driven rollers beyond the lower end of said mandrel engaging the formed tube along a flattened side edge portion thereof for advancing the formed tube in the direction axially of said mandrel.

18. In a packaging machine, a tube forming mandrel, a forming device at one end of the mandrel for progressively guiding a web into tube formation around said mandrel with marginal portions thereof in superimposed seam forming relation, heat sealing mechanism adjacent said mandrel for engaging said marginal web portions and forming therein a continuous seam and mechanism for continuously advancing said web beneath said heat sealing mechanism, said web advancing mechanism comprising laterally spaced pairs of relatively narrow drive rollers spaced beyond the end of said heat sealing mechanism for engaging in tube advancing relation flattened side edge portions on opposite sides of the formed tube.

19. In a machine for continuously forming a series of packages, a hollow mandrel, mechanism for forming a web of material into a tube around said mandrel, feed mechanism for continuously advancing said formed tube, mechanism for circumferentially constricting the tube at predetermined longitudinally spaced areas while said tube is advancing, mechanism for forming successive pairs of individual generally U-shaped metal closures independently of the operation of said constricting mechanism and for delivering said formed closures in paired relation from said closure forming mechanism to said tube constricting mechanism, mechanism incorporated in said tube constricting mechanism and operable therewith for clinching successive pairs of closures around said constricted areas to close the top and the bottom of succeeding packages, and mechanism for delivering material to be packaged to the tube as it leaves the mandrel.

20. In a machine as recited in claim 19 wherein said mechanism for forming said pairs of closures comprises cooperating reciprocable forming members, mechanism for feeding strip material to said forming members, and strip cutting means associated with said forming members whereby said closures are formed and cut from said strip.

21. In a machine for continuously forming a series of packages, an upright frame, a hollow forming mandrel positioned vertically on said frame, mechanism for folding a continuous web of material around said mandrel with the longitudinal edges thereof in contiguous relation, electronic sealing mechanism for joining said edges to form a continuous vertical seam, mechanism for feeding a product through said hollow mandrel in a continuous stream, mechanism for continuously advancing the filled tube, mechanism for constricting the tube material at predetermined vertically spaced areas while said tube is advancing, mechanism operable independently of said constricting mechanism for pre-forming successive pairs of generally U-shaped metal closure clips, said closure pre-forming mechanism having means for delivering said closure clips to said constricting mechanism, and said constricting mechanism having reciprocable clincher plate mechanisms for positioning said pre-formed closure clips around constricted areas of said tubed material and for clinching the same to form the top and bottom of succeeding packages.

22. In a machine as recited in claim 21 wherein the clincher plate mechanisms include a laterally reciprocating anvil member and a backing member therefor, said backing member having combined therewith a positive clip releasing means.

23. In a packaging machine, a tube forming mandrel, a forming plate at the upper end of said mandrel, means for guiding a continuous web of heat sealable material over the forming plate and around the mandrel to bring marginal portions thereof into superimposed overlapping seam forming relation, an elongate electronic sealing element arranged adjacent said mandrel below said forming plate for engagement with said marginal web portions to form the seam therein, said sealing element being mounted on a pivoted arm for movement toward and from said mandrel, a counterweight adjustably mounted on said arm for holding said sealing element in engagement with said superimposed marginal web portions, and means below the sealing element for engaging the formed tube and continuously advancing the same in the direction axially of the mandrel.

24. A package forming mechanism having a fixed hollow mandrel, means for applying a continuous tube formation around said hollow mandrel, means for feeding material to be packaged through the mandrel into the tube in a continuous stream, means for constricting the tube at preedtermined areas, said tube constricting means comprising a frame arranged to extend across the path of axial movement of the tube and mounted to reciprocate in the direction of advancing movement of the tube, a pair of blocks slidably mounted on said frame on opposite sides of the path of movement of said tube, cam means for moving said blocks toward and from each other and means on said blocks for engaging said tube when said blocks are moved toward each other and for constricting the tube throughout a substantial area extending longitudinally of the tube.

25. In a machine for continuously forming a series of packages, a hollow tubular mandrel, mechanism for applying a continuous tube of relatively thin pliable material around said mandrel, mechanism below the end of said mandrel for continuously advancing said tube, a self-contained constricting, sealing and cutting unit mounted for vertical reciprocation below said tube advancing means in the direction of axial movement of said tube, means for reciprocating said unit at regular intervals, said self-contained unit comprising means for constricting the downwardly moving tube along an extended area, means for cutting the tube within the constricted area and means for sealing the constricted tube at spaced points above and below the cutting point during the downward movement of said unit, said unit being free from engagement with said tube during its upward movement, and means for independently controlling the speed of operation of said tube advancing mechanism whereby to vary the rate of advancing movement of the tube relative to the rate of movement of said unit and thereby to vary the length of the packages.

26. In a machine for continuously forming a series of packages, a hollow tubular mandrel, mechanism for applying a continuous tube around said mandrel, mechanism below the lower end of the mandrel for continuously collapsing the open tube along the side margins only thereof and for gripping the collapsed side margins whereby to continuously feed the partially collapsed tube downwardly, mechanism for continuously feeding the material to be packaged down through the mandrel, into the tube and below the partially collapsed portion thereof whereby to reopen the collapsed portion of the tube and substantially fill the same below said tube feeding mechanism, a self-contained constricting, sealing and severing unit mounted for vertical reciprocation below said tube feeding mechanism in the direction of the tube, and means for reciprocating said unit at regular intervals, said unit having means for engaging with and constricting the downwardly moving tube along an extended area, for severing the tube and for sealing the same within the constricted area both above and below the point of severance during the downward movement of said unit, said unit being free from engagement with said tube during its upward movement, and adjustable means which is operative independently of said unit reciprocating means for operating said tube collapsing and feeding mechanism whereby to vary the rate of feed of the tube relative to the rate of reciprocation of said unit.

27. In a machine for continuously forming a series of packages, a hollow tubular mandrel, mechanism for applying an open tube around said mandrel, mechanism comprising continuously driven laterally spaced pairs of cooperating feed rollers mounted beyond the end of the mandrel, for continuously partially collapsing the open tube along relatively narrow side marginal portions thereof and for engaging said collapsed marginal portions to continuously advance the tube, a mechanism for continuously feeding the material to be package through the mandrel into the tube and beyond the partially collapsed portion thereof, whereby to reopen the collapsed portion of the tube and substantially fill the same beyond said tube feeding mechanism, a self-contained constricting, sealing and cutting unit mounted for reciprocation beyond said tube feeding mechanism, means for reciprocating said unit at regular intervals, said unit being moved in the direction of advancing movement of the tube while constricting the tube along an extended area, severing the tube within said constricted area and sealing the same on both sides of the line of severance, said unit being moved in the opposite direction while free from engagement with said tube, and drive means for said feed rollers which is independently adjustable to vary the speed of advance of the filled tube relative to the speed of movement of said unit.

28. In a machine for solidly packaging a fluent material in a thin pliant skin-like casing, a hollow stationary mandrel through which the material to be packaged is adapted to flow downwardly, means for applying a tubular casing of thin pliant skin-like material to the mandrel in telescoping relation to the latter, said tubular casing being movable downwardly about the mandrel and beyond the lower end of the latter to receive said fluent material, means comprising, a self-contained unit mounted below the lower end of the mandrel and movable downwardly in engagement with the filled casing for closing off the filled casing at regular intervals and for severing the same intermediate the upper and lower limits of each closed off area, and for sealing the casing at spaced points above and below the point of severance to divide the filled casing into individual closed end packages of elongated generally cylindrical form, means for operating said closing off means at regular intervals, opposed feeding members engageable respectively with opposed wall portions of the filled casing below the lower end of the mandrel for frictionally gripping the casing and continuously advancing the same toward said closing off means, means for operating said feeding members continuously and at uniform speed, and means for controlling the speed of operation of said feeding members whereby to vary the speed of advance of said casing toward said closing off means.

29. In a machine for solidly packaging a fluent material in a thin pliant casing, a hollow stationary mandrel through which the material to be packaged is adapted to flow, means for positioning a tube of thin pliant casing forming material about the mandrel, said tube being movable downwardly about the mandrel and beyond the lower end of the latter to receive said fluent material, means for continuously feeding the material down through the mandrel and into the tube, means for operating said material feeding means continuously and at a uniform speed, means below the lower end of the mandrel movable downwardly in engagement with the filled tube for closing off the filled tube at regular intervals and for severing the tube intermediate the upper and lower limits of each closed off area to divide the filled tube into individual closed end packages of elongated generally cylindrical form, means for operating said closing off means periodically, oppositely disposed feed rollers engageable respectively with opposed wall portions of the tube below the lower end of the mandrel and above said closing off means, said feed rollers partially collapsing the filled tube and gripping the walls of the tube in the collapsed area whereby to continuously advance the same toward said closing off means, means for operating said feed rollers continuously and at a uniform speed, and means for independently controlling the speed of rotation of said feed rollers relative to the speed of operation of said closing off means whereby to vary the length of the packages and the amount of material in the packages.

30. In a machine of the type in which a fluent material is adapted to be solidly packaged in a thin pliant skin-like container, and in which a hollow stationary mandrel is provided through which the material to be packaged is adapted to move downwardly, which mandrel is adapted to have applied thereto a tubular casing of thin pliant skin-like material, and which casing is adapted to move downwardly about the mandrel into a position below the lower end of the latter to receive the material to be packaged; the provision, below the lower end of the mandrel, of a closing unit for closing off the filled casing at regularly spaced intervals and for severing the casing intermediate the upper and lower limits of each closed off portion, whereby to divide the filled casing into individual closed end containers, means for moving said closing unit downwardly in engagement with the filled casing while performing said closing off and severing operations and for thereafter returning the unit to repeat said operations, a separate casing feeding unit, located below the lower end of the mandrel and above said closing and severing unit, for feeding the casing downwardly while it is being filled, said feeding unit consisting of opposed feed members which are adapted to engage respectively with opposed wall portions of the casing in the section thereof which is being filled and which are adapted to advance the filled casing continuously and at a uniform speed toward said closing unit, and means for operating said feed members to advance the filled casing continuously and at a uniform speed, and means for controlling the speed of operation of said feed members whereby to vary the rate of advance of the filled casing toward said closing off unit.

31. In a machine of the type in which a fluent material is adapted to be solidly packaged in a thin pliant skin-like container, and in which a hollow stationary mandrel is provided through which the material to be packaged is adapted to move downwardly, which mandrel is adapted to have applied thereto a tubular casing of thin pliant skin-like material, and which casing is adapted to move downwardly about the mandrel into a position below the lower end of the latter to receive the material to be packaged; the provision, below the lower end of the mandrel, of a closing unit for closing off the filled casing at regularly spaced intervals whereby to divide the filled casing into individual closed end containers, means for moving said closing unit downwardly in engagement with the filled casing while performing said closing off operation and for thereafter returning the unit free of engagement with said casing to repeat said operation, a separate casing feeding unit, located below the lower end of the mandrel and above said closing unit, for advancing the casing downwardly while it is being filled; said feeding unit comprising opposed feed members which engage respectively with opposed wall portions of the casing in a section thereof which is being filled and which advance the filled casing toward said closing unit, means for operating said feeding unit to advance the filled casing continuously and at a uniform speed as said closing unit moves downwardly and means for controlling the speed of operation of said casing feeding unit whereby to vary the rate of advance of the casing toward said closing unit.

32. In a machine for continuously forming a series of packages, a hollow tubular mandrel, mechanism for applying a continuous tube of relatively thin pliable material in telescoped relation on said mandrel, means for feeding the material to be packaged to said mandrel for discharge therefrom, means for operating said material feeding means continuously and at uniform speed, mechanism beyond the end of said mandrel engageable with opposite sides of the tube while it is being filled for continuously advancing said tube, means for operating said tube advancing means continuously and at uniform speed, a self-contained constricting, sealing and severing unit mounted for reciprocation in the direction of axial movement of the tube, said self-contained unit comprising means for constricting the advancing tube along an extended area, means for sealing the tube at spaced points along the constricted area, and means for severing the tube between the sealing points, means for reciprocating said unit at regular intervals, and means for independently varying the speed of operation of said tube advancing means relative to the speed of operation of said unit to vary the size of the package produced.

33. In a machine for solidly packaging a fluent material in a thin pliant skin-like casing, a hollow vertical mandrel through which the material to be packaged is adapted to flow downwardly, means for applying a tubular casing of thin pliant skin-like material to the mandrel in telescoping relation to the latter, said tubular casing being movable downwardly about the mandrel and beyond the lower end thereof to receive said fluent material, mechanism below the lower end of said mandrel for continuously advancing said tube, an upright supporting frame having spaced side frame members, and a hollow cross frame of box-like construction, said cross frame extending across the path of advancing movement of said tubular casing and having its ends supported on said side frame members for vertically reciprocating movement, means for reciprocating said cross frame at regular intervals, said cross frame having mounted therein means for constricting the downwardly moving casing along an extended area, means for severing the casing within the constricted area and means for sealing the casing both above and below the severing point during the downward movement of said cross frame, and means for independently controlling the speed of operation of said tube advancing mechanism whereby to vary the rate of advancing movement of the tube relative to the rate of movement of said cross frame and thereby to vary the length of the packages.

34. A tube forming and filling machine comprising a base of generally rectangular box-like form provided with a superstructure, which superstructure is located forwadly of the rear portion of the base and spans the base substantially from end to end, a hollow downwardly projecting mandrel mounted on the superstructure above the base, about which mandrel the tube is formed from a web of thin pliant material and through which mandrel the product to be packaged in the tube is fed, means mounted on the superstructure behind the mandrel for rotatably supporting a roll of the material from which the tube is formed, a forming collar mounted on the superstructure in encircling relation to the upper portion of the mandrel for forming the web of material into a tube about the mandrel, a member mounted on the superstructure in front of the mandrel for longitudinally sealing together the edges of the tube, tube engaging means mounted on the superstructure for feeding the tube downwardly after its edges have been sealed longitudinally, a pump mounted on the rear portion of the base behind the superstructure, means connecting the pump with a supply of the product to be packaged, a conduit extending upwardly and forwardly from the pump and connecting the pump with the upper end of the mandrel for delivering the product to the mandrel, tube constricting and sealing means below the tube feeding means, and means mounted in the base for operating the tube constricting and sealing means and the tube feeding means, in timed relation to each other, and means for controlling the speed of operation of the pump thereby to vary the length of the packages and the amount of the product therein.

35. In a machine for continuously forming a series of packages, a hollow tubular mandrel, mechanism for applying a continuous tube of relatively thin pliable material around said mandrel, mechanism below the end of said mandrel for continuously advancing said tube, mechanism including a pump for continuously feeding a product to be packaged through said mandrel to fill said tube as it advances, a self-contained constricting, sealing and cutting unit mounted for reciprocation below said tube advancing means in the direction of axial movement of said tube, means for reciprocating said unit, said unit comprising means for constricting the downwardly moving tube, means for cutting the tube within the constricted area, means for sealing the constricted tube at spaced points above and below the cutting point during the downward movement of said unit, and means for independently controlling the speed of operation of said product feeding pump whereby to vary the amount of material in the packages.

36. In a tube forming and filling machine in which each tube is closed off at one of its ends by a wire clip, means for producing the clips from a continuous length of wire unwound from a roll, and means for intermittently feeding predetermined lengths of the wire from the roll to the clip producing means, said wire feeding means comprising a roller having a peripheral groove in which the length of wire rides, drive means for intermittently rotating the roller, means for pressing the wire into frictional engagement with the bottom of the groove in the roller whereby to cause the wire to be advanced by the rotation of the roller, said clip producing means comprising a forming member mounted for reciprocating movement in a predetermined path, a cooperating anvil member mounted for movement in a path which is transverse of the path of movement of said forming member and means for shifting said anvil member from a position where it is engaged by the clip forming member to form the clip thereon to a position where the clip formed thereon is out of the path of movement of said forming member for removal of the clip from said anvil member in the direction of the movement of said anvil member.

37. In a tube forming and filling machine in which each tube section is closed off at one of its ends by a wire clip, means for producing the clips from a continuous length of wire, means independent of and spaced from the clip producing means for applying the clips to the tube sections, means for transferring the clips from the clip producing means to the clip applying means comprising a member on which the clips are left by the clip producing means and from which the clips are removed by the clip applying means, and means for shifting said transfer member from a position in register with the clip producing means into a different position in register with the clip applying means for removal of the clips therefrom prior to the application of the clips to the tube sections.

38. In a machine for continuously forming a series of packages, a hollow tubular mandrel, mechanism for applying a continuous tube of material around said mandrel, mechanism for feeding a product to be packaged through said hollow mandrel to fill said tube, mechanism below the end of said mandrel for continuously advancing said tube, a self-contained constricting, sealing and cutting unit mounted for vertical reciprocation below said tube advancing means in the direction of axial movement of said unit, means for reciprocating said unit at regular intervals, said unit comprising means for constricting the downwardly moving tube along an extended area, means for cutting the tube within the constricted area and means for sealing the constricted tube at spaced points above and below the cutting point during the downward movement of said unit, and mechanism between said tube advancing mechanism and said self-contained unit which is operative on the downwardly moving filled tube for flattening the filled tube along an area corresponding approximately to the area along which the tube is constricted by said unit whereby to move substantial portions of the product out of said area and facilitate the constricting of the same by said unit.

39. In a machine for solidly packaging a fluent material in a thin pliant skin-like casing, a hollow vertical mandrel through which the material to be packaged is adapted to flow downwardly, means for applying a tubular casing of thin pliant skin-like material to the mandrel in telescoping relation to the latter, said tubular casing being movable downwardly about the mandrel and beyond the lower end thereof to receive said fluent material, an upright supporting frame having spaced side frame members and a cross frame extending across the path of advancing movement of said tubular casing with its ends supported on said side frame members for vertical reciprocating movement, said cross frame having mounted therein means for constricting the downwardly moving casing along an extended area, means for severing the casing within the constricted area and means for sealing the casing above and below the severing point during the downward movement of said cross frame, and means on said supporting frame for engaging said tubular casing on opposite sides thereof and at a point between the lower end of the mandrel and the path of reciprocating movement of said cross frame, said casing engaging means being operative to flatten said casing along an area corresponding approximately to the area in which said casing constricting means is effective.

40. In a tube forming, filling and closing machine wherein a hollow mandrel is supported on a frame, and means is provided for forming a tube of relatively thin pliable film material around the mandrel, for advancing the tube beyond the mandrel, and for feeding a product to be packaged through the mandrel and into the tube to substantially fill the same while the tube is advancing beyond the mandrel, said product being in a semi-fluid state and having therein a component in the form of chunks which are somewhat harder than the remainder of the product, the provision of a tube flattening mechanism which comprises oppositely disposed swingably mounted bracket arms, rollers mounted on the free ends of said bracket arms and positioned on opposite sides of said advancing tube, drive means connected with said rollers for rotating said rollers at approximately the same speed as the advancing movement of the filled tube and means for swinging said bracket arms intermittently to engage the rollers thereon with the filled tube whereby the filled tube is flattened and the hardened chunks in the product are cleared from successive predetermined areas which are spaced along said tube.

41. In a tube forming, filling and closing machine wherein a hollow mandrel is supported on a frame, and means is provided for forming a tube of relatively thin pliable film material around the mandrel, for advancing the tube beyond the mandrel and for feeding a product to be packaged through the mandrel and into the tube to substantially fill the same while it is advancing, the provision of a tube flattening mechanism which comprises a pair of rollers disposed on opposite sides of the advancing tube and extending across the same, and mechanism for intermittently reciprocating said rollers to bring the same into cooperating flattening engagement with opposite sides of said tube whereby to flatten the product therein along predetermined spaced areas.

42. In a tube forming, filling and closing machine having a hollow mandrel supported on a frame, and cooperating means for forming a tube of relatively thin pliable film material around the mandrel, for advancing the tube beyond the mandrel and for feeding a product to be packaged through the mandrel and into the tube to substantially fill the same while the tube is advancing beyond the mandrel, the provision of a mechanism for flattening the product in the tube which comprises a pair of swingably mounted oppositely disposed arms, rollers rotatably mounted on the free ends of said arms, a power drive and gearing connecting said power drive to said rollers, and means for intermittently swinging said rollers into flattening engagement with opposite sides of said tube at a point beyond the mandrel whereby to flatten the product therein along a predetermined area.

43. In a machine for solidly packaging a fluent material in a thin pliant skin-like casing, a hollow vertical mandrel through which the material to be packaged is adapted to flow downwardly, means for applying a tubular casing of thin pliant skin-like material to the mandrel in telescoping relation to the latter, said tubular casing being movable downwardly about the mandrel and beyond the lower end thereof to receive said fluent material, an upright supporting frame and a cross frame extending across the path of advancing movement of said tubular casing supported on said upright frame for vertical reciprocating movement, said cross frame having means for constricting the downwardly moving casing along an extended area, means for severing the casing within the constricted area and means for sealing the casing above and below the severing point during the downward movement of said cross frame, and means for engaging said tubular casing on opposite sides thereof and at a point between the lower end of the mandrel and the path of reciprocating movement of said cross frame, said casing engaging means comprising cylindrical members rotatably mounted on reciprocable supporting members and means to reciprocate said supporting members in timed relation to the advancing movement of said casing whereby to engage and flatten said casing along an area corresponding approximately to the area in which said casing constricting means is effective.

44. In a tube forming, filling and closing machine wherein a hollow mandrel is supported on a frame, and means is provided for forming a tube of relatively thin pliable film material around the mandrel, for advancing the tube beyond the mandrel and for feeding a product to be packaged through the mandrel and into the tube to substantially fill the same while it is advancing, the provision of a tube flattening mechanism which comprises movable bracket arms, cylindrical members mounted on said bracket arms and positioned on opposite sides of said advancing tube, means for rotating said cylindrical members in the same direction as the movement of said tube and means for moving said bracket arms at intervals to engage said cylindrical members with the filled tube whereby to flatten the product therein along predetermined spaced areas.

45. In a tube forming and filling machine in which each tube section is closed off at its ends by a wire clip, means for producing the clips from a continuous length of wire, means spaced from said clip producing means for applying the clips to the tube sections, and means for transferring the clips from the clip producing means to the clip applying means, said clip producing means including a movable anvil member on which the clips are formed and a member for forming the clips on the anvil member and for severing them from the length of wire, said clip transfer means including means for moving said anvil member from the clip producing means to a position adjacent the clip applying means and said clip applying means including means for removing the clips from said anvil member and for positioning the clips for application to the tube sections.

46. In a tube forming and filling machine in which each tube section is closed off at one of its ends by a wire clip, means for producing the clips from a continuous length of wire, means spaced from the clip producing means for applying the clips to the tube sections, and means for transferring the clips from the clip producing means to the clip applying means, said clip producing means including an anvil member and a cooperating forming member, means cooperating with said clip forming member for severing said wire to separate therefrom the successive clips as they are formed on said anvil member, said clip transfer means including means for reciprocating said anvil member between the clip producing means and the clip applying means, and said clip applying means having means for removing the clips from said anvil member and positioning the same for application to the tube sections.

47. A tube forming and filling machine comprising a base of generally rectangular box-like form provided with a superstructure, which superstructure is located forwardly of the rear portion of the base and spans the base substantially from end to end, a hollow downwardly projecting mandrel mounted on the superstructure above the base, about which mandrel the tube is formed from a web of thin pliant material and through which mandrel the product to be packaged in the tube is fed, means mounted on the superstructure behind the mandrel for rotatably supporting a roll of the material from which the tube is formed, a forming collar mounted on the superstructure in encircling relation to the upper portion of the mandrel for forming the web of material into a tube about the mandrel, a member mounted on the superstructure in front of the mandrel for longitudinally sealing together the edges of the tube, tube engaging means mounted on the superstructure for feeding the tube downwardly after its edges have been sealed longitudinally, a pump mounted on the rear portion of the base behind the superstructure, means connecting the pump with a supply of the product to be packaged, a conduit extending upwardly and forwardly from the pump and connecting the pump with the upper end of the mandrel for delivering the product to the mandrel, a tube constricting, sealing and cutting unit mounted below the tube feeding means, means for reciprocating said unit, said unit comprising means for constricting the downwardly moving tube, means for cutting the tube within the constricted area, means for sealing the tube at spaced points above and below the cutting point during downward movement of said unit, and means for controlling the speed of operation of said pump whereby to vary the amount of material in the packages.

48. In a machine for continuously forming a series of packages, a frame support, a hollow forming mandrel fixed on said frame support, mechanism for applying a tube around said mandrel and for advancing the tube along the mandrel, mechanism for feeding a product through said hollow mandrel in a continuous stream, a reciprocable frame movable in the direction of axial movement of said tube, a pair of oppositely disposed heads movable on said frame and positioned on opposite sides of the advancing tube, said heads being movable in a plane extending transversely of the axial movement of said tube, each of said heads comprising a plurality of relatively thin plate members having V-shaped slots extending outwardly from the inner edges thereof and opening toward the opposite head, the inner end portions of the plates in each head being spaced to accommodate therebetween the inner end portions of the plates on the opposite head, means for moving said heads toward each other to bring the inner end portions of said plates into interleaved relation for constricting the tube at predetermined areas spaced longitudinally of said tube, mechanism for preforming a pair of generally U-shaped closures, and for delivering said closures to one of said heads, said last mentioned head having pockets formed between spaced plates thereon for receiving said closures and clinching members on said heads for clinching said closures around a constricted area of said tube to close the top of one package and the bottom of the next succeeding package when said heads are moved toward each other.

49. In a machine for continuously forming a series of packages, which machine is characterized by a hollow forming mandrel and mechanism for applying a continuous tube about the mandrel and advancing the tube beyond the end of the mandrel, a tube dividing and closure applying mechanism adjacent the end of the mandrel, said dividing and closure applying mechanism comprising a frame mounted for reciprocation in the direction of movement of the advancing tube, constricting heads mounted in said frame for movement toward and from said tube to engage the tube at axially spaced points and constrict a substantial section thereof at each engagement, mechanism for forming and separating from a pair of metal strips generally U-shaped closure elements, said closure forming mechanism comprising an anvil member mounted for reciprocating movement in a path generally parallel with and adjacent the path of movement of the advancing tube, cooperating movable forming members for shaping the closure elements around the anvil at one point in its path of movement, and means to move said anvil from a position in register with said forming members for receiving the closure elements thereon to a position in the path of movement of one of said constricting heads whereby to deliver successive pairs of closure elements to said head, said head having mechanism for receiving said closure elements from said anvil and for thereafter moving said closure elements into position about constricted portions of said tube and said heads having means for clinching said closure elements to form spaced closures thereon.

50. In a machine for continuously forming a series of packages, which machine is characterized by a hollow forming mandrel and mechanism for applying a continuous tube about the mandrel and for advancing the tube continuously beyond the end of the mandrel, a tube dividing and closure applying mechanism adjacent the end of the mandrel comprising a frame mounted for reciprocation in the direction of movement of the advancing tube, constricting members mounted for reciprocation in said frame transversely of the direction of movement of the tube and adapted to engage the tube at axially spaced points and constrict a substantial section thereof at each engagement, mechanism for forming from a pair of strips of relatively stiff material generally U-shaped closure elements, said closure forming mechanism comprising an anvil member movable in the direction of movement of the tube, cooperating members movable transversely of the movement of the anvil member for forming the closure elements on the face of the anvil member, means for moving said anvil member into and out of the path of movement of one of said constricting members whereby to position successive pairs of closure elements between said constricting members and said tube, said constricting members having means for receiving said closure elements and for removing the same from said anvil and having clinching members for securing said closure elements in position about constricted portions of said tube by closing the same around the tube.

51. In a machine for continuously forming a series of packages, a hollow tubular mandrel, mechanism for applying an open tube around said mandrel, mechanism comprising continuously driven cooperating tube feeding members mounted beyond the end of the mandrel, for continuously partially collapsing the open tube along opposed wall portions thereof and for frictionally engaging said collapsed wall portions to continuously advance the tube, mechanism for continuously feeding the material to be packaged through the mandrel into the tube and beyond the partially collapsed portion thereof, whereby to reopen the collapsed portion of the tube and substantially fill the same beyond said tube feeding mechanism, means below the lower end of the mandrel movable into engagement with the filled tube for closing off the filled tube at regular intervals and for severing the tube intermediate the upper and lower limits of each closed off area to divide the filled tube into individual closed end packages, means for operating said closing off means periodically, and drive means for said tube feeding members which is adjustable to vary the speed of advance of the filled tube relative to the speed of operation of said closing off means.

References Cited in the file of this patent
UNITED STATES PATENTS

| | | |
|---|---|---|
| 1,986,422 | Zowyer | Jan. 1, 1935 |
| 2,154,521 | Maxfield | Apr. 18, 1939 |
| 2,635,234 | Reed | Apr. 21, 1953 |